(12) United States Patent
De Bruin

(10) Patent No.: US 12,213,447 B2
(45) Date of Patent: Feb. 4, 2025

(54) CLIMATE CONTROLLED STABLE

(71) Applicant: YOR Innovation B.V., Wageningen (NL)

(72) Inventor: Yorick Anthony Tristan Franciscus Henricus De Bruin, Wageningen (NL)

(73) Assignee: YOR Innovation B.V., Wageningen (NL)

( * ) Notice: Subject to any disclaimer, the term of this patent is extended or adjusted under 35 U.S.C. 154(b) by 863 days.

(21) Appl. No.: 17/417,737

(22) PCT Filed: Dec. 31, 2019

(86) PCT No.: PCT/NL2019/050884
§ 371 (c)(1),
(2) Date: Jun. 23, 2021

(87) PCT Pub. No.: WO2020/141978
PCT Pub. Date: Jul. 9, 2020

(65) Prior Publication Data
US 2022/0071167 A1 Mar. 10, 2022

(30) Foreign Application Priority Data
Dec. 31, 2018 (NL) ..................................... 2022333

(51) Int. Cl.
*A01K 1/00* (2006.01)

(52) U.S. Cl.
CPC ...... *A01K 1/0047* (2013.01); *B01D 2257/102* (2013.01)

(58) Field of Classification Search
None
See application file for complete search history.

(56) References Cited

U.S. PATENT DOCUMENTS 3,280,536 A * 10/1966 Berlin .................. B01D 53/047
  95/105
4,281,789 A    8/1981 Quinlisk
(Continued)

FOREIGN PATENT DOCUMENTS

EP    0635205 A1    1/1995
FR    2710816 A1 *  4/1995    ........... A01K 1/0047
(Continued)

OTHER PUBLICATIONS

Shpilrain. (2017.) Air (Properties Of). Thermopedia. Accessed May 13, 2024 at https://web.archive.org/web/20170701155904/https://www.thermopedia.com/cn/content/553/ (Year: 2017).*

(Continued)

*Primary Examiner* — Brian A McCaig
(74) *Attorney, Agent, or Firm* — Smith Baluch LLP

(57) ABSTRACT

The invention provides a system comprising a closed stable comprising a stable space for housing ruminants, wherein the system is configured for controlling in a controlling mode a methane concentration in the stable air between a minimal methane concentration $C_{m-} \geq 500$ ppmv and a maximal methane concentration $C_{m+}$ selected to be equal to or smaller than the lower explosion limit of methane in the stable air $C_{mLEL}$, and wherein the system is configured for controlling in the controlling mode a dinitrogen concentration in the stable air to be smaller than the ambient dinitrogen concentration in ambient air.

17 Claims, 4 Drawing Sheets

(56) References Cited

U.S. PATENT DOCUMENTS

| | | | | |
|---|---|---|---|---|
| 10,219,490 | B2* | 3/2019 | Meter | A01K 41/00 |
| 2009/0038551 | A1* | 2/2009 | Baker | A61L 2/00 |
| | | | | 119/14.02 |
| 2013/0098306 | A1 | 4/2013 | Loosveld et al. | |
| 2015/0334980 | A1* | 11/2015 | Van Raam | A01K 1/01 |
| | | | | 52/302.1 |

FOREIGN PATENT DOCUMENTS

| | | | | |
|---|---|---|---|---|
| FR | 2772638 | A1 * | 6/1999 | A01K 1/0047 |
| FR | 3063869 | A1 * | 9/2018 | |
| KR | 200351889 | Y1 * | 6/2004 | |
| KR | 20090013061 | U * | 12/2009 | |
| RU | 2436917 | C1 | 12/2011 | |
| WO | 2009020858 | A1 | 2/2009 | |

OTHER PUBLICATIONS

FR2710816A1_ENG (Espacenet machine translation of Saez) (Year: 1995).*

FR2772638A1_ENG (Espacenet machine translation of Roussel) (Year: 1999).*

KR200351889Y1—preview (IP.com machine translation of New Eclipse) (Year: 2004).*

FR3063869A1_ENG (Espacenet machine translation of Greffet) (Year: 2018).*

KR20090013061U—preview (IP.com machine translation of Song) (Year: 2009).*

International Search Report and Written Opinion in International Patent Application No. PCT/NL2019/050884 mailed Mar. 12, 2020, 10 pages.

* cited by examiner

CLIMATE CONTROLLED STABLE

CROSS-REFERENCE TO RELATED APPLICATIONS

This application is a national-phase application under 35 U.S.C. 371 of International Application No. PCT/NL2019/050884 filed on Dec. 31, 2019, which claims priority to Netherlands Application No. 2022333 filed on Dec. 31, 2018. Each of these applications is incorporated herein by reference in its entirety for all purposes.

FIELD OF THE INVENTION

The invention relates to a system comprising a closed stable. The invention yet further relates to a method for reducing gaseous emissions from livestock keeping.

BACKGROUND OF THE INVENTION

Climate controlled stables are known in the art. For instance, U.S. Pat. No. 4,281,789A describes a device for controlling the temperature and the humidity of the air in a barn having a thermostat, humidistat, heater and damper to maintain the desired proper temperature and humidity conditions for animal housing. The temperature is held at a desired level by the thermostat which monitors the temperature and heats and circulates the existing air in the barn as required. In addition, the humidistat initiates a process of heating outside air and supplying of heated dry air to the barn in response to abnormally high humidity conditions and thereby maintains the desired optimum temperature and humidity conditions.

SUMMARY OF THE INVENTION

The human population may be expected to grow rapidly to more than 9 billion people in 2050, which would be about a 30% increase relative to 2015; global food production may require a similar increase in order to continue feeding the world. Such an increase may provide various challenges, in particular in relation to sustainable farming, such as sustainable farming of livestock, especially in the dairy industry.

The efficiency in the dairy industry may be substantially lower in those areas of the world where the highest population growth may be expected. For example, in India, the average milk yield per milk-producing animal per year may be about 1,270 kg whereas in the European Union the average milk yield per animal per year may be about 6,860 kg. Hence, an increase in dairy food production matching the increasing population growth may be expected to result in a substantial increase in the number of animals in the dairy industry, further resulting in an increased waste production and environmental impact.

During enteric fermentation, methane ($CH_4$) may be produced in the rumen of ruminants in response to feeding. The ruminants may excrete the $CH_4$ via respiration and flatulence directly or indirectly into ambient air. $CH_4$ is a (anthropogenic) greenhouse gas ("GHG") and may have a global warming potential of 28. This global warming potential indicates that the impact of the emission of 1 kg of $CH_4$ on global warming may be approximately 28 times bigger than the impact of the emission of 1 kg of carbon dioxide ($CO_2$).

The release of $CH_4$ into the ambient air may not only be wasteful with regards to the environmental impact but may further be wasteful with regards to potential beneficial use of $CH_4$ as, for example, a fuel (within the stable). The beneficial use of $CH_4$ within the stable may, however, require higher $CH_4$ concentrations than those typically reached in prior art stables as these may not be designed to capture methane.

Besides GHG such as $CH_4$, the agricultural sector may produce other byproducts, which may commonly be regarded as waste, such as ammonia ($NH_3$) and particulate matter. Hence, in order to limit the production of waste, especially the production of GHG and $NH_3$, in the dairy sector, an increased production efficiency and/or improved (waste) management may be required. Hence, it is an aspect of the invention to provide a system for a stable, which preferably further at least partly obviates one or more of above-described drawbacks. It is a further aspect of the invention to provide a method for reducing methane emissions from livestock keeping, which preferably further at least partly obviates one or more of above-described drawbacks. The method may especially comprise housing the livestock in a stable space of a closed stable of the system described herein. The present invention may have as object to overcome or ameliorate at least one of the disadvantages of the prior art, or to provide a useful alternative.

Therefore, in a first aspect, the invention provides a system comprising a closed stable comprising a stable space for housing livestock, wherein the stable space comprises stable air, and wherein the system is especially configured for controlling (in a controlling mode) an air property of the stable air. The system especially comprises the stable space for housing livestock, especially for housing ruminants. Hence, the term "system" may especially refer to a "housing system". Especially, the system comprises a control system configured for controlling (in a controlling mode) an air property of the stable air. The air property may comprise one or more of temperature, relative humidity, pressure, air composition, and any other air properties that may affect livestock and/or stable performance. The air property may be any air property relevant for the well-being and/or the type of livestock, especially any air property relevant for one or more traits related to the production of an animal product. Hence, the air property of the stable air may be tuned, especially controlled, in order to improve the performance of the livestock and/or the stable. Improving the performance of the livestock may e.g. relate to improving the (animal) product property or production (rate) of the animal, or e.g. the welfare of the animal. Improving the performance of the stable may relate to e.g. reducing the emission (of unwanted gasses and/or solid material and/or odor). Especially, the air property of the stable air may be tuned in order to (i) obtain higher (animal) product yields, (ii) reduce waste production, especially GHG production, (iii) improve animal welfare, and/or (iv) improve (animal) product quality. These beneficial outcomes may not be unrelated. For example, improvements in animal welfare (also "animal comfort") may be well known to lead to higher yields, lower waste production and/or improved product quality.

Typically, the control of an air property (such as in climatization) may cost a lot of energy, especially when ambient air needs to be cooled to fit the needs of the livestock. The system according to the present invention may reduce the energy required for controlling the air characteristics as air may be recirculated within the closed stable. Further, the system may monitor and adjust the stable air composition to avoid toxic components in the air to build up as livestock may produce gaseous (waste) compounds such as $CO_2$, $CH_4$, and non-methane volatile organic compounds (NMVOC), as well as urine and manure, which may further emit gases, such as $NH_3$, into the stable air. Especially, the system may be designed to use one or more of the produced gaseous (waste) compounds, especially the produced $CH_4$ and/or $NH_3$.

In embodiments, the system may comprise an air property adjustment device configured to adjust (a value of) an air property, especially an air property of stable air. In further embodiments, the air property adjustment device may comprise a device selected from the group consisting of a temperature control element, a humidity control element, a gas filter system, or a pressure control element. The term "(adjustment) device" may especially refer to a plurality of (different) (adjustment) devices.

Herein, the system is, for explanatory purposes, primarily described with regard to embodiments designed to reduce the GHG, especially $CH_4$ emission and/or $NH_3$ emission of the system during operation. Furthermore, the system is herein, for explanatory purposes, primarily described with regard to embodiments for housing ruminants, especially cattle. It will be clear to a person skilled in the art, however, that the invention described herein is not to be limited to such embodiments.

Hence, in specific embodiments, the invention provides a system comprising a closed stable comprising a stable space for housing livestock, especially ruminants, wherein the system, especially the control system, is configured for controlling in a controlling mode an air property of the stable air, especially a methane concentration in the stable air. Hence, embodiments of the method (see also below) may especially comprise controlling (or selecting) the air property of the stable air, such as the methane concentration in the stable air and/or a concentration of another gaseous compound in the stable air.

In embodiments, the $CH_4$ will predominantly be produced by the livestock, especially by the ruminants, i.e., during operation (of the system) the livestock may provide $CH_4$ to the stable air.

The system according to the invention may be designed to minimize the release of $CH_4$ to ambient air. Especially, the system may be designed to accumulate $CH_4$ in the stable air such that a useable concentration of $CH_4$ is reached, especially a concentration being sufficient for further processing, e.g. for further upgrading the stable air (see further below). In embodiments, the system may be configured for controlling the methane concentration in the stable air between a minimal methane concentration $C_{m-}$ and a maximal methane concentration $C_{m+}$. Especially, the minimal methane concentration $C_{m+} \geq 500$ ppmv, and especially the maximal methane concentration is selected to be equal to or lower than the lower explosion limit of methane in the stable air $C_{mLEL}$ ($C_{m+} < C_{mLEL}$).

In specific embodiments, the invention provides a system comprising a closed stable comprising a stable space for housing ruminants, wherein the system is configured for controlling in a controlling mode a methane concentration in the stable air between a minimal methane concentration $C_{m-} \geq 500$ ppmv and a maximal methane concentration $C_{m+}$ selected to be equal to or smaller than the lower explosion limit of methane in the stable air $C_{mLEL}$, and wherein the system is configured for controlling in the controlling mode a dinitrogen ($N_2$) concentration in the stable air to be smaller than the ambient dinitrogen ($N_2$) concentration in ambient air. In further specific embodiments, the system, especially the stable further comprises a floor element configured for separating manure and urine deposited at the floor element (see below).

In further embodiments, the system may comprise a methane accumulation space, wherein the system is configured for controlling the methane concentration in the methane accumulation space between a minimal (second) methane concentration $C_{2m-}$ and a maximal (second) methane concentration $C_{2m+}$. Hence, the method may comprise controlling the methane concentration in the methane accumulation space between a minimal (second) methane concentration $C_{2m-}$ and a maximal (second) methane concentration $C_{2m+}$. Especially, the minimal (second) methane concentration $C_{2m-} \geq 500$ ppmv, and especially the maximal (second) methane concentration $C_{2m+}$ is selected to be equal to or lower than the lower (second) explosion limit of methane in the methane accumulation space (air) $C_{2mLEL}$ ($C_{2m+} < C_{2mLEL}$). In further embodiments, $C_{2m-} \geq 300$ ppmv, especially $C_{2m-} \geq 400$ ppmv, such as $C_{2m-} \geq 500$ ppmv, more especially $C_{2m-} \geq 1000$ ppmv, such as $C_{2m-} \geq 2000$ ppmv, even more especially $C_{2m-} \geq 5000$ ppmv, such as $C_{2m-} \geq 10000$ ppmv. In further embodiments, $C_{2m+} \leq 70000$ ppmv, especially $C_{2m+} \leq 65000$ ppmv, such as $C_{2m+} \leq 60000$ ppmv, more especially $C_{2m+} \leq 55000$ ppmv, such as $C_{2m+} \leq 50000$ ppmv, even more especially $C_{2m+} \leq 40000$ ppmv, such as $C_{2m+} \leq 30000$ ppmv.

As the air property of stable air may differ from the air property of air in the methane accumulation space, $C_{mLEL}$ and $C_{2mLEL}$ may have different values. In further embodiments, $C_{mLEL}$ and $C_{2mLEL}$ may have the same value. In embodiments, especially, the minimal second methane concentration equals the minimal methane concentration, and/or the maximal second methane concentration equals the maximal methane concentration, and/or the lower second explosion limit of methane (in the methane accumulation space) equals the lower explosion limit of methane (in the stable air).

In embodiments, the methane accumulation space may comprise the stable space. In further embodiments, the methane accumulation space may be functionally connected to the stable space. In further embodiments, the methane accumulation space may be in fluid connection to the stable space.

In embodiments, the methane accumulation space may be functionally coupled to the gas filter system, especially to a methane filter system (see below). Hence, in further embodiments, the system may comprise a methane filter system comprising a methane filter, wherein the methane filter is configured for capturing $CH_4$ from the methane accumulation space air fed to the methane filter. The methane filter system may be configured to provide the filtered air to the stable air and/or the ambient air. In further embodiments, the methane after system may be configured to provide the captured $CH_4$ to a methane consumption system. In further embodiments, the methane filter system may (further) be configured to provide the captured $CH_4$ to a methane storage system.

The term "livestock" (also: "animal") herein generally refers to any wild or domesticated animal raised in an agricultural setting to produce an animal product. The term "livestock" especially refers to any farm animal, especially cattle, including cows, sheep, goats, pigs, horses, fish and/or poultry. The term livestock may further refer to any animal that is kept to provide an animal product, including animals such as worms and insects providing alternative protein sources. Livestock especially refers to ruminants, more especially to cattle, such as cows.

The term "stable" herein (then) generally refers to any accommodation suitable for the keeping of the livestock. Generally, a stable (also "shed", "barn", "pasture", "pen", "house") may be any structure, especially (in) a building, configured to house livestock. The stable may comprise a stable space. The stable space may especially be the space configured for housing the livestock in the stable. In embodiments, the stable space may comprise stalls. Additionally or alternatively, the stable space may comprise (specialized) farm equipment such as feeding equipment and/or milking equipment. The term "closed stable" specifically refers to a stable that is generally closed, i.e., a closed stable provides an interior space having limited gas exchange to an exterior space, especially during at least a part of, especially most of (such as at least 80%, especially at least 90%, even more especially at least 95% of), the (operational) time. In general, the (closed) stable according to the invention may be configured to minimize the uncontrolled outflow of stable air (and uncontrolled inflow of fresh ambient air). Such an uncontrolled outflow may be caused by (small) holes/openings in a stable wall, but also by opening of doors required for the movement of personnel, animals and/or goods. In embodiments, the uncontrolled outflow of stable air from the stable space per hour may (on average) be at maximum 2%, such as less than 1%, especially less than 0.5%, of the volume of the stable space. In further embodiments, an under pressure may be imposed to the stable space. In such embodiments, the uncontrolled inflow of ambient air into the stable space per hour may (on average) be less than 2%, such as less than 1%, especially less than 0.5%. Especially, the uncontrolled outflow (of stable air) substantially equals the uncontrolled inflow (of ambient air).

Hence, in a closed stable, an outflow of stable air to ambient air may substantially comprise a controlled outflow and an inflow of ambient air to stable air may substantially comprise a controlled inflow, i.e., the stable space may comprise a volume, wherein an uncontrolled outflow of stable air from the stable space (to the ambient air) per hour is less than 2% of the volume, and wherein an uncontrolled inflow of ambient air into the stable space per hour is less than 2% of the volume (see further below). A closed stable may be particularly beneficial with regard to controlling of an air property at a value that is different from the value of ambient air. The closed stable may especially comprise a climate controllable stable. In embodiments, the (closed) stable may comprise a substantially hermetically sealed stable. In further embodiments, the (closed) stable may be thermally insulated. In further embodiments, the (closed) stable may be insulated with respect to airflow. In embodiments, the air property of the stable air may comprise an air pressure, wherein the air pressure in the stable air may be below the air pressure of ambient air.

Such an underpressure may be used to limit an uncontrolled outflow of stable air from the stable. The uncontrolled outflow of stable air may be undesirable as the stable air may have the desired air properties (and energy may have been invested to obtain the desired air properties). Yet, in further embodiments, the air pressure in the stable air may exceed the air pressure of ambient air to limit, especially prevent, ambient air from entering the stable. The overpressure may be used, for example, to limit, especially substantially prevent, contaminations from entering the (closed) stable.

The term "cow" herein especially refers to any female member of the Bovinae subfamily, more especially to any female member of the Bos genus comprising wild and domestic cattle.

The term "(animal) product" herein especially refers to any product that may be obtained from the keeping of livestock, such as meat, eggs, milk, fur, leather, and wool. It will be clear to a person skilled in the art that the obtained animal products depend on the type of livestock and that the animal product may, for example, comprise (whole and/or ground) insects.

Herein, the term "stable air" and similar terms especially refer to the air in the stable space. An air property may vary throughout the stable air. For example, the temperature may change (gradually) over a height in the stable space. The temperature may e.g. be lower (or higher) at a top of the stable space than near a floor (carrying or supporting the livestock) of the stable. Hence, any air property of the stable air may especially refer to an (volume) average value of the air property of the stable air. The stable air further especially refers to the air at, especially surrounding and/or contacting, the livestock. Especially, the term "stable air" may also refer to a stable air sample, such as a sample withdrawn from the stable space, for a (remote) analysis. The term "ambient air" especially relates to air outside of (external of) the stable space, more especially to air outside of the system, such as especially atmospheric air. The term "air" may refer to, as far as applicable, to one or more of stable air, ambient air, recirculated air, as well as to other types of air described herein. Hence, the term air in a phrase such as "a sensor element senses an air property of air" may refer to stable air and/or to ambient air and/or to recirculated air and/or to other types of air. The features of the invention may herein be primarily described with regard to the stable air, however, it will be clear that these features may, as far as applicable, further apply to the other types of air described herein and should not be considered to be limited to the stable air.

The term "air property" may refer to an air property such as selected from the group comprising temperature, humidity, composition, and pressure. The term air property may especially refer to a plurality of (different) air properties. The term "air property" may further refer to a value of the air property, i.e., the term "air property" may thus refer to a general property such as temperature, but may also refer to a specific value of the temperature, such as 9° C. The (air) composition may especially comprise the concentration of one or more gaseous compounds (in the air). Hence, the air property may refer to the concentration of one or more gaseous compounds selected from the group comprising, $CH_4$, $CO_2$, dioxygen ($O_2$, also "oxygen"), dinitrogen ($N_2$, also "nitrogen", "molecular nitrogen" or "diatomic nitrogen"), hydrogen sulfide ($H_2S$), $NH_3$, and non-methane volatile organic compounds (NMVOC). NMVOCs are known to the skilled person and comprise organic chemicals/compounds that have a high vapor pressure at room temperature, such that at least part of the compound is evaporated at room temperature. Examples of NMVOCs may be formaldehyde and methylamine.

The system, especially the control system, may be configured for controlling (in a controlling mode) an air property of stable air in the stable space. The system, especially the control system, may maintain the air property at a present value, but may also increase or reduce the value of the air property (to a determined value). Likewise, the method may comprise maintaining the air property at a present value, and/or increasing or reducing the value of the air property (to a determined value). Hence, the term "controlling", such as in "controlling an air property" refers to directly and/or indirectly adjusting and/or maintaining the value of the air property. Hence, the system may comprise or be functionally coupled to a device configured to adjust the air property. In embodiments, the system may be functionally coupled to a temperature control element, such as a heating and/or a cooling device, and may be configured to control the temperature control element. In further embodiments, the system may, for example, be functionally coupled to one or more of a gas filter system, an airflow device, or a humidity control element. It will be clear to a person skilled in the art how an air property may be controlled, especially adjusted.

A phrase such as "the system is configured for controlling (in a controlling mode) a process" may especially refer to the system comprising a control system, wherein the control system is configured for controlling the process. Alternatively or additionally, (other) devices, e.g., comprised by the system, such as an air property adjustment device may comprise an (individual) control unit or controller. Likewise, the term "controlling" such as in a phrase like "controlling (in a controlling mode) a parameter" may especially refer to controlling the control system to maintain and/or adjust the parameter.

In embodiments, the system may comprise or be functionally coupled to a gas filter system. Hence, in embodiments, the gas, such as the stable air and/or ambient air may be filtered, especially wherein a gaseous compound may be captured from the air (and filtered air and/or the captured gaseous compound may be provided). The gas filter system especially comprises a gas filter configured to capture a gaseous compound from air fed (or provided) to the gas filter. The gas filter system may be configured to provide (filtered) air to the stable air and/or to the ambient air. The gas filter system may further (be configured to) provide the captured gaseous compound to the stable air and/or to the ambient air and/or to a device configured to store and/or process (including use and/or consume) the captured gaseous compound. In embodiments, the air may be fed to the gas filter passively. In further embodiments, the gas filter system may be configured to feed air to the gas filter. In yet further embodiments, an airflow device may be configured to feed air to the gas filter.

The term "filtering" herein especially refers to the separating of (two or more) gaseous compounds. For example, a methane filter system may be a filter system configured to separate $CH_4$ from other air components, such as via a swing adsorption system (see below).

In embodiments, the gas filter system, especially the gas filter, may be fed stable air. In further embodiments, the gas filter system, especially the gas filter, may be fed ambient air. In embodiments, the system may comprise or be functionally coupled to a plurality of gas filter systems, especially wherein at least one gas filter system is configured to be fed stable air and wherein at least one other gas filter system is configured to be fed ambient air. The gas filter system may be fed both stable air and ambient air. Herein the terms "fed", "provide", "feeding" and "providing" are used in relation to the gas filter system (and also in relation to the airflow device, see further below). It will be understood that when an air flow is guided through a device such as through a filter (in which no or only some air properties may be adjusted) providing or feeding the air to the device may also be achieved by withdrawing the (adjusted) air from the device.

In further embodiments, the gas filter system may be configured to capture a gaseous compound selected from the group comprising $CO_2$, $CH_4$, $N_2$, $H_2S$, $NH_3$ $H_2O$, $N_2O$, NMVOC and $O_2$. In such embodiments, the gas filter system may herein be suitably referred to as a methane filter system, a dinitrogen filter system, or a dioxygen filter system based on the to-be-captured gaseous compound. Hence, in embodiments, the gas filter system comprises a methane filter system. In further embodiments, the gas filter system comprises a dinitrogen filter system. In yet further embodiments the gas filter system (further) comprises a dioxygen filter system.

Herein the terms "a gas filter" and "a gas filter system" may relate to a plurality of (different) gas filters and/or a plurality of (different) gas filter systems. Especially, the term "gas filter" relates to more than one (different) gas filter. The system may thus comprise a plurality of gas filters and/or gas filter systems. Yet, in a further embodiments the system may comprise (at least) one gas filter and/or gas filter system (configured) for capturing a plurality of different gaseous compounds.

In embodiments, the system, especially the control system, may comprise or be functionally coupled to the gas filter system. Especially, the system may be configured to control the gas filter system. In embodiments, the gas filter system is controlled. In further embodiments, the system may be configured to control the feeding of air to the gas filter (and/or the withdrawing of filtered air from the gas filter).

In further embodiments, the gas filter system may comprise a swing adsorption (SA) system, especially a SA system selected from the group consisting of a pressure swing adsorption (PSA) system, a temperature swing adsorption (TSA) system, and a vacuum swing adsorption (VSA) system. The SA system may comprise a combination of more than one (different) SA systems. The SA system may in embodiments comprise a pressure temperatures swing absorption (PTSA) system. In embodiments, the gas is provided to and especially filtered by an SA system.

Swing adsorption is a technique to separate one or more of the gaseous compounds in a gas mixture from the other gaseous compounds based on differences in the molecular characteristics of the gaseous compounds and especially their affinity for an adsorbent material (if present in the system), especially at different processing conditions (pressure, temperature). For example, a PSA system may be configured to selectively adsorb one target gaseous compound at a high pressure while other gaseous compounds pass through. Then, when the pressure is reduced, the adsorbed compound is released. SA systems are known to a person skilled in the art. The person skilled in the art will select an adsorbent material suitable for the gaseous compound to be captured. In embodiments, the SA system comprises an adsorbent material configured to capture a gaseous compound, wherein the adsorbent material comprises a material selected from the group comprising zeolites, activated carbon, silica gel, alumina, resin, and molecular sieves, especially wherein the gaseous compound is selected from the group consisting of $O_2$, $N_2$, $H_2S$, $NH_3$, $CO_2$ and $CH_4$.

The SA system may be similarly suitably named as aforementioned, i.e., in embodiments, the system, especially the control system may comprise or be functionally coupled to a methane filter system, wherein the methane filter system comprises a methane (pressure) swing adsorption system. Similarly, the invention may relate to a dinitrogen (pressure) swing adsorption system or a dioxygen (pressure) swing adsorption system.

In general, a SA system may (beneficially) be used to extract a gaseous compound from air if the concentration of the gaseous compound exceeds a minimal concentration such as a minimal concentration of at least 500 ppmv, especially at least 1,000 ppmv (one thousand ppmv), such as at least 3,000 ppmv (three thousand ppmv), especially at least 6,000 ppmv (six thousand ppmv), such as at least 10,000 ppmv (ten thousand ppmv). The minimal concentration may differ for different gaseous compounds. The minimal concentration may, however, especially also be the same for different gaseous compounds. Hence, the minimal methane concentration may especially be the minimal concentration for a SA system to extract the $CH_4$.

In embodiments, the SA system may comprise a plurality, such as two (substantially identical) functionally coupled SA systems. In such embodiments, a first SA system may be applied for adsorption of a gaseous compound (under first process conditions), whereas (simultaneously) a second SA system may be applied to release the (same) gaseous compound (using second process conditions). Especially, the first and second SA systems are functionally coupled such that they alternate in capturing and releasing the gaseous compound, i.e. they may alternate in operating under the first process conditions and the second process conditions. Such use of two or more functionally coupled adsorbent vessels for near-continuous production is known to the person skilled in the art.

In embodiments, the system may be configured to capture a gaseous (waste) compound, especially wherein the captured (waste) product can be beneficially used for operating the stable. Especially, the system may be configured to capture $NH_3$ and/or $CH_4$. Furthermore, the method may especially comprise capturing $NH_3$ and/or $CH_4$. Additionally or alternatively, other gaseous compounds are captured (and/or filtered).

$CH_4$ may be produced by the livestock, i.e., the livestock may provide $CH_4$ to the (stable) air. For instance, ruminants may produce $CH_4$. Especially, methane production may increase after feeding of the livestock. The livestock may provide at least part of the produced $CH_4$ directly to the (stable) air via respiration and flatulence. The livestock may further provide part of the $CH_4$, as well as other waste compounds such as $NH_3$, as part of their solid and/or liquid excrements, especially as part of manure and urine. Gaseous $CH_4$ may (also) be released from the solid and/or liquid excrements into the (stable) air. Typically, the design of prior art stables may result in $CH_4$ being released to the ambient air, which may be undesired as $CH_4$ is a potent GHG. Further, in prior art stables wherein the methane concentration is managed, the methane concentration may typically be kept low due to fears regarding explosions and/or adverse health effects.

However, $CH_4$ may constitute a useful (by-)product of stable operations. Especially, $CH_4$ may be used as a fuel to power one or more devices/systems operating at the stable. The utilization of $CH_4$ may require the capturing of $CH_4$ from the stable air. However, the capturing of $CH_4$ from the stable air may only be (economically and/or technically) feasible once the methane concentration exceeds a minimal methane concentration $C_{m-}$. Hence, in embodiments the system may be configured for controlling the methane concentration (in the stable air) above $C_{m-}$ Especially $C_{m-} \geq 300$ ppmv, especially $C_{m-} \geq 400$ ppmv, such as $C_{m-} \geq 500$ ppmv, more especially $C_{m-} \geq 1000$ ppmv, such as $C_{m-} \geq 2000$ ppmv, even more especially $C_{m-} \geq 5000$ ppmv, such as $C_{m-} \geq 10000$ ppmv.

As a comparative example, prior art stables may typically have a methane concentration in the range of 10-160 ppmv during operation. Especially, in prior art solutions, systems may be configured such that the methane concentration does not exceed, for example, 200 ppmv during operation.

The concept of elevating the methane concentration in the stable air is accompanied by several considerations regarding (i) flammability, (ii) $CH_4$-related health concerns, and (iii) $O_2$ availability.

Elevated CEE levels ("concentrations") may be dangerous as CEE is a flammable gas and should, therefore, be managed properly. The biggest risk with a flammable gas may be the risk of explosion. Although other factors may influence the onset of an explosion, the most important factor for an explosion may be the composition of the gas mixture in air. A $CH_4$-comprising gas mixture may have a lower explosion limit (LEL) and an upper explosion limit (UEL), wherein the LEL indicates a minimal concentration (of $CH_4$) for an explosion to occur and the UEL indicates a maximal concentration (of $CH_4$) for an explosion to occur. When an inert gas, such as $N_2$ ("molecular nitrogen", or "dinitrogen"), is added to the gas mixture, the LEL and the UEL may get closer together and eventually become one value i.e., the range of concentrations allowing an explosion decreases, eventually to a single value. At this point, the $O_2$ present in the air mixture may limit the possibility for an explosion. The level of $O_2$ present when LEL and UEL are the same value is called the limiting oxygen concentration (LOC); if the $O_2$ concentration is below the LOC, no explosion can occur. $CH_4$ may be known to have an LEL of between 40,000 and 50,000 ppmv and a UEL between 150,000 and 162,000 ppmv at room temperature and atmospheric pressure.

Hence, in embodiments the system may be configured for controlling the methane concentration (in the stable air) below a maximal methane concentration $C_{m+}$. Especially, $C_{m+} \leq C_{mLEL}$, wherein $C_{mLEL}$ is the lower explosion limit of $CH_4$ in the stable air. Especially, $C_{m+} \leq 0.9 * C_{mLEL}$, such as $\leq 0.8 * C_{mLEL}$. The value of $C_{mLEL}$ may change as the air properties of the stable air change. For example, the LEL may change due to temperature, composition, and pressure of the (stable) air.

Hence, in further embodiments, the system may be configured for controlling the methane concentration below a maximal methane concentration $C_{m+}$. Especially, $C_{m+} \leq 70000$ ppmv, especially $C_{m+} \leq 65000$ ppmv, such as $C_{m+} \leq 60000$ ppmv, more especially $C_{m+} \leq 55000$ ppmv, such as $C_{m+} \leq 50000$ ppmv, even more especially $C_{m+} \leq 40000$ ppmv, such as $C_{m+} \leq 30000$ ppmv.

Alternatively, explosion danger may be averted by controlling the methane concentration above the UEL. Hence, in embodiments, the system may be configured for controlling the methane concentration (in the stable air) above the minimal methane concentration $C_{m-}$. Especially, $C_{m-} \geq 150000$ ppmv, especially $C_{m-} \geq 155000$ ppmv, such as $C_{m-} \geq 160000$ ppmv, more especially $C_{m-} \geq 161000$ ppmv, such as $C_{m-} \geq 162000$ ppmv, even more especially $C_{m-} \geq 163000$ ppmv, such as $C_{m-} \geq 165000$ ppmv. The method may comprise controlling the methane concentration below the maximal (second) methane concentration and/or above the minimal (second) methane concentration.

Prolonged exposure to elevated concentrations of a gaseous compound may provide adverse health effects. However, it is currently not known at which concentrations $CH_4$ may provide adverse health effects to animals, especially livestock, such as ruminants. However, it is hypothesized that exposure to elevated concentrations of the gaseous compound may also be beneficial. For example, elevated methane concentrations may provide anti-inflammatory effects in animals. Elevated methane concentrations may thus improve animal comfort.

Elevated methane concentrations imply that the concentrations of (one or more) other gaseous compounds are reduced. For example, the $O_2$ concentration may be reduced as a direct consequence of the increased methane concentration. As a decrease in $O_2$ concentration may be undesired due to respiratory needs and animal comfort, the system may be configured to avoid the decrease in $O_2$ concentration by (pre-emptively) increasing or reducing the concentration of one or more gaseous compounds in the stable air, especially increasing the $O_2$ concentration or reducing the $N_2$ concentration.

Hence, in embodiments, the system may comprise a dinitrogen filter system, wherein the dinitrogen filter system comprises a dinitrogen filter, wherein the dinitrogen filter is configured for capturing $N_2$ from the air, especially stable air and/or ambient air, fed to the dinitrogen filter. In further embodiments, the system, especially the dinitrogen filter system, may be configured for controlling (in a controlling mode) the dinitrogen concentration in the stable air to be smaller than the ambient dinitrogen concentration in ambient air. Hence, the system, especially the dinitrogen filter system, may "make space" for other gaseous compounds by reducing the concentration of a selected gaseous compound, especially $N_2$, from the stable air.

In further embodiments, the dinitrogen filter system is configured to provide the filtered air (especially comprising a reduced $N_2$ concentration) to the stable air. In further embodiments, the dinitrogen filter system is configured to provide the captured $N_2$ to the ambient air. Hence, in embodiments, the dinitrogen filter system may be fed ambient air, wherein the dinitrogen filter system captures $N_2$ from the ambient air, thereby effectively providing filtered air enriched in non-dinitrogen gaseous compounds, such as enriched in $O_2$, and wherein the dinitrogen filter system provides the filtered air to the stable air. In further embodiments, the dinitrogen filter system may be fed stable air, wherein the dinitrogen filter system captures $N_2$ from the stable air. Hence, filtered air enriched in non-dinitrogen gaseous compounds, such as enriched in $O_2$, may (effectively) be provided, especially wherein the dinitrogen filter system provides the filtered air to the stable air. By applying a dinitrogen filter the (molecular) nitrogen concentration in the stable air may be controlled at a reduced level relative to (molecular) nitrogen concentration in ambient air.

As gases may accumulate in the closed stable thereby affecting the air composition, such as effectively decreasing the $O_2$ concentration, the system may, in embodiments, be configured to (i) reduce the generation of gases, and/or (ii) to filter gases from the stable air (see below). Hence, in embodiments, the system may be configured to reduce the generation of $NH_3$, especially via a floor (element) configured to separate urine and manure (see further below). Hence, the method may comprise reducing the generation of gasses (such as by minimizing the production of the gasses like $NH_3$) and/or filtering gasses from the stable air.

The $CH_4$ may be captured from the stable air and be provided to a methane consumption and/or methane storage system. Especially, in embodiments, the system may comprise a methane filter system comprising a methane filter, wherein the methane filter is configured for capturing $CH_4$ from the air, especially the stable air, fed to the methane filter. The methane filter system may be configured to provide the filtered air to the stable air and/or the ambient air. In further embodiments, the methane filter system may be configured to provide the captured $CH_4$ to a methane consumption system (and/or to a methane storage system). In further embodiments, the methane filter system may (further) be configured to provide the captured $CH_4$ to a methane storage system.

In further embodiments, the methane filter system may comprise a SA system selected from the group comprising a PSA system, a VSA system and a TSA system, especially one or more SA systems selected from the group comprising a PSA system, a VSA system and a TSA system and a combination of the respective SA systems. Especially, the methane filter system may comprise a (methane) (pressure) swing adsorption system.

Hence, in embodiments, the methane filter system may comprise a methane pressure swing adsorption system, wherein the methane pressure swing adsorption system is configured to capture $CH_4$ from the stable air, especially wherein (when) the methane concentration in the stable air exceeds a minimal concentration, such as a minimal concentration of at least 500 ppmv, especially at least 1,000 ppmv, such as at least 3,000 ppmv, especially at least 6,000 ppmv, such as at least 10,000 ppmv.

In specific embodiments, the methane filter system may comprise a biofilter system. The higher the concentration of $CH_4$ in the air fed to the biofilter, the more effective the filtering may be. Therefore, a minimum concentration of $CH_4$ may be preferred in the stable air (fed to the methane filter system) to achieve energy-efficient filtering of the biofilter system. The minimum concentration for energy-efficient filtering by a biofilter system may be approximately 400 mg/m$^3$. However, other methane filter systems (such as swing absorbers) may already be energy-efficient at lower methane concentrations.

Hence, in embodiments, the methane filter system may be activated when the concentration of $CH_4$ in the air (in the stable space) exceeds a lower methane limit such as a lower methane limit of 100 ppmv, especially 150 ppmv, such as 200 ppmv, especially 400 ppmv. Especially, the system may control the methane filter system such that the methane filter system is active when the concentration of $CH_4$ in the (stable) air exceeds a lower methane limit. Yet, in alternative embodiments, the methane filter system may be continuously or e.g. periodically be active, independent from the methane concentration in stable air.

In embodiments, the methane filter system may be configured to capture $CH_4$ from the stable air and to provide the captured $CH_4$ to a methane storage system (directly or, e.g., at a later stage). In the method, $CH_4$ may be captured from the stable air and especially the captured $CH_4$ may be provided to the methane storage system. As the methane concentration in the methane storage system may generally exceed the methane concentration in the stable air, the methane concentration in the storage system may exceed the LEL. Hence, to avoid a risk of explosion, the system may be configured to first lower or remove substantially all $O_2$ from the stable air via an oxygen filter system, especially an oxygen (pressure) swing adsorption system, before $CH_4$ will be concentrated by the methane filter system. By removing $O_2$ from the gas mixture, the $O_2$ concentration in the methane filter system and in the methane storage system will stay below the LOC for $CH_4$, thereby substantially reducing the risk for an explosion. The LOC may be approximately 10 vol. %.

In embodiments, the methane concentration in the methane storage unit may be selected in the range of 50-100 vol. %, such as in the range of 55-100 vol. %, especially 65-100 vol. %, such as 80-95 vol. %. In embodiments, the methane storage system may comprise pressurized methane. In further embodiments, the methane storage system may (be configured to) provide $CH_4$ to a methane consumption system. In further embodiments, the methane storage system may (be configured to) provide $CH_4$ to a transport vessel for remote use and/or sale of the $CH_4$.

In further embodiments, the methane filter system may (be configured to) provide a methane product to a methane consumption system and/or to a methane storage system, especially wherein the methane product comprises a methane concentration selected from the range of 50-100 vol. %, such as from the range of 55-100 vol. %, especially 65-100 vol. %, such as 80-95 vol. %. The methane concentration to (or in) the methane storage unit and/or methane consumption unit may especially be equal to or smaller than 99.9 vol. %, such as equal to or smaller than 99.5 vol. %, especially equal to or smaller than 99 vol. %

However, in further embodiments, the system is not configured to control the methane concentration. As such, the system does not necessarily comprise a methane filter system and/or is (not necessarily) functionally coupled to a methane filter system.

In further embodiments, the system may comprise or be functionally coupled to a methane consumption system. In yet further embodiments, the system comprises the methane consumption system. In yet further embodiments, the system is functionally coupled to the methane consumption system.

In further embodiments, the methane filter system may be functionally coupled to a methane consumption system, more especially wherein the methane filter system provides $CH_4$ to the methane consumption system. Hence, $CH_4$ may be provided to the methane consumption system and/or storage system. The methane adsorption (and/or filter) system may provide periodically (captured) $CH_4$ to the methane consumption system. In further embodiments, the methane adsorption (filter) system may be configured to continuously provide $CH_4$ to the methane consumption system. The methane storage system may be configured to continuously or periodically provide $CH_4$ to the methane consumption system. Hence, the methane storage system may be configured for load matching, i.e., to store $CH_4$ when methane production exceeds methane consumption, and to provide $CH_4$ to the methane consumption system when methane consumption exceeds methane production. For example, a methane consumption system may require a constant methane supply during the day. Alternatively or additionally, a (different type of) methane consumption system may only require $CH_4$ during (brief) parts of the day. Similarly, the methane production may not be equal throughout the day, especially as livestock may produce more $CH_4$ after feeding.

The methane consumption system may comprise any system configured to consume $CH_4$, especially wherein the $CH_4$ is beneficially consumed, such as wherein the consumption benefits the operation of another element of the system, and/or wherein the consumption provides a marketable product. In specific embodiments, the methane consumption system may comprise one or more of a combined heat power system, an algae production unit, and/or a liquefied natural gas production system.

Hence, in embodiments the system comprises or is functionally coupled to a combined heat power (CHP) system. The CHP system may be configured to consume an input gas, especially a $CH_4$-comprising gas, and to provide electricity and/or heat. In embodiments, the CHP system may be configured to receive a plurality of input gases and to combine the plurality of input gases to a single gas that is consumed. For example, the CHP system may receive $CH_4$ (a $CH_4$-comprising gas) from the methane filter system and/or the methane storage system, and may receive a biogas from a biogas production system (see below). Hence, the term "input gas" may relate to more than one (different) input gasses. The electricity provided by the CHP may be used to operate the system, especially one or more devices and/or systems in the system. The heat may be released into the stable air to provide heating. In embodiments, the heat may be provided to a hygienization device configured to provide hygienization of manure (see further below).

A relative disadvantage of the CHP may be that although the GHG $CH_4$ is consumed, the GHG $CO_2$—a substantially less harmful GHG—is concurrently produced. In embodiments, the CHP may be beneficially coupled with another system to utilize the produced $CO_2$, such as the algae production unit.

In further embodiments, the system comprises or is functionally coupled to an algae production unit. The algae production unit may be configured to turn a ($CH_4$-comprising) waste stream into algal biomass and/or algal products. Algae may typically use sunlight and $CO_2$ as primary resources to grow and produce products. The sunlight may be naturally provided by arranging the algae production unit external to the system, or by arranging the algae production unit inside the system such that it is reached by incident sunlight. The $CO_2$ may be provided by the CHP. Hence, in embodiments the CHP may (be configured to) provide $CO_2$ to the algae production unit. In further embodiments, the algae production unit may comprise methane oxidizing bacteria (MOB) combined with algae. In such embodiments, $CH_4$ and/or $CO_2$ and one or more other compounds may be fed to a system that contains algae that use $CO_2$ to grow, wherein the MOB transform $CH_4$ into $H_2O$ and $CO_2$ (with $O_2$). The availability of a close-by source of $CO_2$ may improve the productivity, especially the growth, of the algae. It may be possible to feed the algae that are grown in the system to the dairy cows. Other options for the algae produced are diverse and include the use of algae (products) as fertilizer, food colorant, and fuel. Other outputs of this system may, for example, be $O_2$, and the biopolymer polyhydroxybutyrate (PHB). $O_2$ may be released into the (ambient and/or stable) air. The PHB produced in this system may be used to produce biodegradable plastic.

In further embodiments, the system comprises or is functionally coupled to a liquefied natural gas production system. The liquefied natural gas production system may be configured to transform the gaseous compounds produced in the stable, especially $CH_4$, to liquefied natural gas (LNG). LNG consists primarily of $CH_4$ and other gaseous compounds such as $N_2$, propane ($C_3H_8$), and ethane ($C_2H_6$), although the gaseous compounds other than $CH_4$ may not be necessary for the use of LNG. The LNG may further comprise one or more non-methane volatile organic compounds (NMVOC) captured from the stable air. The production of LNG may be similar to the managing of the input for the CHP and may, thus, also be configured to receive a biogas from a biogas production system.

In yet further embodiments the system comprises a CHP system and an LNG production system, wherein the LNG production system is configured to provide LNG to the CHP, wherein the CHP converts the LNG to electricity and heat. In further embodiments, the produced LNG may be used to operate the system, especially a device/system in the system. In yet further embodiments, the LNG may be used to operate a system external of the system, such as a tractor or another farm vehicle. In yet further embodiments, the LNG may be used remotely and/or be sold.

In specific embodiments, the methane consumption system may comprise two or more systems selected from the group consisting of a combined heat power system, an algae production unit, and/or a liquid natural gas production system, such as each of the three mentioned systems. Yet, also other methane consumption systems are feasible and may be used. The three methane consumption systems provide sustainable handling of the gases produced inside the system, especially in the stable. By separating the gases into individual gases via filtering, especially via (pressure) swing adsorption, it may be possible to utilize the gases for multiple purposes. The possibility of combining the three options may be advantageous as the output of the LNG production system may be used for the CHP, and the output of the CHP may be used for the algae production system.

In embodiments, the system, especially the control system, may be configured for controlling the methane filter system. In further embodiments, the system may be configured for controlling the methane consumption system. In yet further embodiments, the system may be configured for controlling the methane storage system.

In further embodiments, the system, especially the control system, may be configured for controlling one or more gas filter systems to control a composition of the stable air. The composition of the stable air may be controlled (by the housing system, especially by the control system). The system may control the composition of the stable air by controlling one or more gas filter systems to selectively filter a gaseous compound out of the stable air and providing the filtered air to the stable air, while providing the gaseous compound elsewhere, such as to the ambient air, or such as to a storage system. The system may further control the composition of the stable air by controlling one or more gas filter systems to selectively filter a gaseous compound out of ambient air and providing the filtered air to the stable air, or, alternatively, providing the gaseous compound to the stable air.

In specific embodiments, the system may be configured to control the air composition such that the stable air comprises an elevated methane concentration while substantially not reducing the dioxygen concentration (especially not having a reduced dioxygen concentration relative to ambient air). Especially, the system may be configured to reduce the dinitrogen concentration in the stable air, especially to "make room" for the $CH_4$. Hence, in further embodiments, the system may be configured for controlling (in a controlling mode) a dinitrogen concentration in the stable air to be in the range of 700,000-780,000 ppmv, especially in the range of 720,000-775,000 ppmv. Hence in embodiments, the dinitrogen concentration in the stable air is maintained (or controlled to be) in the range of 700,000-780,000 ppmv, such as in the range of 720,000-775,000 ppmv.

In embodiments, the system may be configured for controlling the composition of the stable air, especially for controlling the concentration of one or more gaseous compounds in the stable air. In embodiments, the composition of stable air is controlled (of one or more gaseous compounds in the stable air). Especially the (relevant) gaseous compounds (in (stable) air) are selected from the group comprising $CH_4$, $CO_2$, $O_2$, $N_2$, $H_2S$, $NH_3$, and non-methane volatile organic compounds (NMVOC).

The closed stable may provide an environment wherein ambient air is selectively introduced and wherein (part of) the stable air is selectively released. For example, ambient air may be reduced in $N_2$ prior to being introduced in the stable, and/or $N_2$ may be selectively released (extracted) from the stable. Such a closed system may result in increased concentrations of one or more (trace) gaseous compounds. For example, argon may accumulate in the stable during operation. Although argon is generally not regarded as problematic, elevated concentrations may be undesired. Hence, the system may be configured for controlling the concentration of argon in the stable air. Similarly, the system may be configured for controlling the concentration of any other (trace) gaseous compound that may accumulate in the stable air.

Hence, in embodiments, the system may be configured for controlling (in a controlling mode) the methane ($CH_4$) concentration (especially in the stable air) to be in the range of 0-100,000 ppmv, especially in the range of 0-50,000 ppmv, such as in the range of 500-45,000 ppmv, especially in the range of 5000-35,000 ppmv.

In further embodiments, the system may be configured for controlling (in a controlling mode) the dioxygen ($O_2$) concentration (especially in the stable air) to be in the range of 180,000-240,000 ppmv, especially in the range of 190,000-230,000 ppmv, such as in the range of 200,000-220,000 ppmv.

In further embodiments, the system may be configured for controlling (in a controlling mode) the carbon dioxide ($CO_2$) concentration (especially in the stable air) to be in the range of 0-20,000 ppmv, especially in the range of 0-10,000 ppmv, such as in the range of 0-5000 ppmv.

In further embodiments, the system may be configured for controlling (in a controlling mode) the nitrous oxide ($NO_x$) concentration (especially in the stable air) to be in the range of 0-2000 ppmv, especially from the range of 0-1000 ppmv, such as from the range of 50-500 ppmv.

In further embodiments, the system may be configured for controlling (in a controlling mode) the ammonia ($NH_3$) concentration (especially in the stable air) to be in the range of 0-1,000 ppmv, especially from the range of 0-500 ppmv, such as from the range of 10-200 ppmv.

In further embodiments, the system may be configured for controlling (in a controlling mode) the NMVOC concentration (especially in the stable air) to be in the range of 0-500 ppmv, especially from the range of 0-300 ppmv, such as from the range of 10-100 ppmv.

In further embodiments, the system may be configured for controlling (in a controlling mode) the hydrogen sulfide ($H_2S$) concentration (especially in the stable air) to be in the range of 0-500 ppmv, especially in the range of 0-300 ppmv, such as in the range of 10-100 ppmv. Especially, the system may be configured for controlling the combined concentration of NMVOC and $H_2S$ (especially in the stable air) to be in the range of 0-500 ppmv, especially 0-300 ppmv, such as 10-100 ppmv.

In further embodiments, the system may be configured for controlling (in a controlling mode) the argon (Ar) concentration (especially in the stable air) to be in the range of 0-20,000 ppmv, such as 5,000-15,000 ppmv, especially 9,000-10,000 ppmv.

Hence, embodiments of the methods may further comprise maintaining one or more of the methane ($CH_4$) concentration, the dioxygen ($O_2$) concentration, the carbon dioxide ($CO_2$) concentration, the nitrous oxide ($NO_x$) concentration, the ammonia ($NH_3$) concentration, the NMVOC concentration (especially in the stable air) at (or if required adjusting to) a value selected from the respective ranges described above.

It will be clear that the system and/or the control system controlling a concentration of a gaseous compound may refer to the system and/or the control system controlling (in a controlling mode) a device/system configured to adjust the concentration of the gaseous compound. Hence, the system controlling a nitrous oxide concentration may, for example, refer to the system, especially the control system, controlling a nitrous oxide filter system. Furthermore, maintaining and or adjusting such concentration may relate to controlling the system, especially the control system controlling the device/system configured to adjust the concentration (of the respective gaseous compound)

The unit "ppmv" herein refers to parts per million by volume. Hence, 10,000 ppmv corresponds to 1 vol. %. All references to the air composition herein are made with reference to dry air, i.e., air not containing (excluding) any water vapor. For example, the composition of the stable air and the ambient air may be compared as dry air, thereby correcting for differences in water vapor ("humidity") content.

The relative humidity of the stable air may be one of the key factors in animal (dis)comfort, especially with regard to heat stress. Heat stress and corresponding animal discomfort may substantially hinder increasing the productivity of livestock, such as dairy products, especially in the developing countries which may undergo the largest population growth and increased demand for animal products, especially for dairy products.

Livestock may be susceptible to heat stress when environmental temperatures are high. Heat stress may lead to an increased body temperature of an animal. Furthermore, heat stress may be known to result in a change in animal behavior, including the feeding behavior, and may eventually result in animal death. For example, cows may eat less while having heat stress, which may reduce the quantity and quality of their milk production. Heat stress may also have a negative impact on the fertility of dairy cows. Especially, high productive dairy cows may be more susceptible to heat stress as they may have a higher metabolic level to sustain high milk production, which may simultaneously result in a higher heat production. Heat may thus be one of the main proponents of animal (dis)comfort.

When the environmental temperature is above an upper critical temperature (UCT), severe heat stress may occur. In dairy cows with a high milk production, the UCT may be around 25 to 26° C. Also when the temperature is above the thermo-comfort zone (upper limit may be at approximately 12° C. for high productive dairy cows), cows may suffer from heat stress. The lower critical temperature (LCT) may be below 0° C. For instance, the LCT may be approximately −16° C. for cows producing 30 kg of fat-corrected milk daily.

Not only high environmental temperatures may evoke heat stress, also the relative humidity (RH), wind speed, radiation, metabolic activity, and physical activity may be of importance. The RH refers to the ratio (often expressed in percentages) of the partial pressure of water vapor to the equilibrium vapor pressure of water for a given temperature. The higher the RH is, the lower the rate of water evaporation may be, thereby reducing the effectiveness of water evaporation as a cooling mechanism. Similarly, water sprinklers may not be an effective cooling mechanism under high-RH conditions. In order to quantify heat stress, temperature-humidity indices (THI) has been devised that relate to temperature and relative humidity. Different THI indices may be best in different climates. In humid climates, the THI that describes heat stress best may have a higher weight on humidity compared to the best THI in dry climates.

Hence, in embodiments, the system may comprise a humidity control element, especially a dehumidifier, configured to control a relative humidity of the stable air. The method may further comprise maintaining (or adjusting) the relative humidity of the stable air (especially between a minimal relative humidity and a maximum relative humidity) In further embodiments, the humidity control element may be configured to control the relative humidity of the stable air above a minimal relative humidity. Especially the minimal relative humidity $RH_{min}$ may be (selected to be) ≥10%, such as ≥20% especially ≥30%, such as ≥35%, more especially ≥40%. In yet further embodiments, the humidity control element may be configured to control the relative humidity of the stable air below a maximal relative humidity. The maximum relative humidity $RH_{max}$ may especially be (selected to be)≤90%, such as ≤80%, especially ≤70%, such as ≤65%, more especially ≤60%. Hence, in further embodiments, the humidity control element may be configured to control the relative humidity in the stable air in the range of 20-80%, such as in the range of 35-75%, especially 50-70%. In further embodiments, the system, especially the control system, may be configured for controlling the humidity control element to control a relative humidity of the stable air in the range of 10-90%, especially in the range of 20-80%, such as in the range of 35-80%, especially 35-75%, more especially 45-67%.

In further embodiments, the system may comprise a temperature control element, especially a cooling device, configured to control a temperature of the stable air to a stable air temperature. The stable air temperature may especially be in the range of −15-25° C., such as 0-20° C., especially 10-15° C. In further embodiments, the system, especially the control system, may be configured for controlling the temperature control element to control the temperature of the stable air in the range of −15-25° C., such as 0-20° C., especially 10-15° C. Especially, for dairy cows producing milk, the temperature may especially be controlled in the range of 0-20° C., For calves, dairy cows in their dry period, or e.g. other types of animals, especially ruminants, other stable air temperature ranges may be selected, e.g. in the range of 10-30° C., especially in the range of 10-25° C., such as in the range of 10-20° C. In further embodiments, the temperature may be controlled in the range of 10-25° C., such as in the range of 10-20° C. The method may comprise maintaining the stable are at the stable air temperature (by contacting the stable air with the cooling device).

The cooling device may comprise a (heat exchanging) surface comprising a heat conductive material for transferring heat from surroundings of the surface to a cooling medium functionally coupled to the surface. The surface may be enlarged using (conductive) fins or plates attached to e.g. a (base) frame, especially comprising a cooling medium. For instance, (stainless) steel plates may be arranged at a heat conductive frame, such as at a metal frame (comprising the cooling medium) for increasing a total heat exchanging surface. The plates may be arranged to allow air to flow between the plates. The plates and the frame may form an angle larger than 0° and especially equal to or smaller than 90°. The cooling device may comprise a cooling pad. In embodiments, the cooling device, especially the cooling pad, may comprise a plurality of stainless steel plates that are attached to a metal frame at an angle selected from the range of 0°-90°. In embodiments, the cooling pad may have a size selected from the range of 100-1500×50-800×500-5000 mm, especially from the range of 800-1000×400-600× 1500-4000 mm, such as from the range of 900-1000×500-600×2000-4000 mm. The cooling device, especially, the cooling pad may further have a cooling capacity selected from the range of 1-5 kW per (livestock) animal in the stable space, such as from the range of 1.5-3 kW per animal.

In specific embodiments, the cooling device, especially the cooling pad, may further be configured to dehumidify the air with a dehumidification capacity selected from the range of 100%-5% RH, such as 60%-40% RH. Especially, the cool temperature of the cooling device may cause condensation, thereby reducing the humidity of the air (that is cooled by the cooling device). Hence, in specific embodiments the cooling device and the dehumidifier may be the same device.

In specific embodiments, the system may further comprise a liquid filter system. The liquid filter system may be configured to provide a filter solution, especially a slightly basic or a slightly acidic filter solution. Especially, the liquid filter system may be configured to provide a filter solution to ran over the cooling device, more especially over (the plates attached to) the cooling pads. Providing such filter solution to the cooling device may provide a filtering of $N_2$ and/or VOC at the cooling device. The pH of the filter solution may be selected from the range of 5-9.

In embodiments, the cooling device may be configured such that a temperature difference between the air returning to the stable space after having passed the cooling device and the stable air is less than 5° C., such as less than 4° C., especially less than 3° C. A too large temperature difference between the air (re-)entering the stable space and the stable air may lead to an air current ("draft"), which may reduce animal comfort.

Hence, in further embodiments, the cooling device may have a (relatively) large working area, such as a large (heat exchanging) surface area relative to a volume of the stable space, such as a surface area selected from the range of 0.1-0.6 $m^2$, especially from the range of 0.24-0.4 $m^2$, per animal spot in the stable space, for example, if the stable space if configured to host 100 ruminants, the surface area may be selected from the range of 10-60 $m^2$, especially from the range of 24-40 $m^2$.

In further embodiments, the system, especially the control system, may be configured for controlling the cooling device such that a temperature difference between the air having passed the cooling device, especially the recirculated air (see below), and the stable air is less than 5° C., such as less than 4° C., especially less than 3° C.

In embodiments, the method may comprise providing the stable air to a cooling device and/or a dehumidifier to controlling a relative humidity of the stable air in the range of 35-80%, and/or to control a temperature of the stable air in the range of 0-20° C.

In embodiments, the system may comprise a circulation space in fluid connection to the stable space. The circulation space may be configured to receive stable air from the stable space and to provide recirculated air to the stable space. The circulation space may be functionally coupled to an air property adjustment device configured such that (the value of) an air property of the recirculated air differs from the (value of the same) air property of the stable air. In embodiments, the air property may be set by circulating the stable space air through the circulation space (or providing the air to the circulation space). Especially, the air property may be selected from the group consisting of a temperature, a relative humidity, a pressure and an air composition, more especially from the group comprising temperature, relative humidity and air composition.

The term "recirculated air" especially refers to air that has passed the circulation space. In general, the recirculated air has passed an air property adjustment device and thus has a modified (value of an) air property relative to the stable air entering the circulation space. Especially, the recirculated air has passed a plurality of air property adjustment devices. In embodiments, the circulation space is functionally coupled to one or more air property adjustment devices. The term "circulation space" may especially relate to a space in general, e.g. a space at a (determined) location. The circulation space may in embodiments be comprised by, especially surrounded the stable space. In specific embodiments, the circulation space is part of the stable space. The circulation space may comprise a volume, especially in fluid communication with the (remainder of the) stable space, and especially (also) in fluid connection with an (one or more) air property adjustment device. In embodiments, the air property device may be arranged in the circulation space, especially in the stable space comprising the circulation space. In embodiments, the cooling device may e.g. at least partly be enclosed by the circulation space. For instance, the cooling device may be arranged in the circulation space, especially being at least partly surrounded by the stable space. The circulation space may in embodiments not to be physically delimited. Essentially, a fluid (air) flow may move (such as be transported) from the (remainder of the) stable space to the circulation space and especially from the circulation space (back) to the stable space again (e.g. as recirculated air). The circulation space may, in further embodiments, at least partly, be physically delimited, e.g. by a wall (of e.g. a pipe, housing, or a construction element).

In specific embodiments, the system comprises a circulation space in fluid connection to the stable space, wherein the circulation space is configured to receive stable air from the stable space and to provide recirculated air to the stable space, wherein the system is configured for controlling the cooling device such that a temperature difference between the recirculated air and the stable air is less than 5° C.

In embodiments, the air property adjustment device may comprise one or more of the gas filter system, the humidity control element, and the temperature control element. Especially, the air property adjustment device may comprise one or more of the methane filter system, the dinitrogen filter system, the dehumidifier, and the cooling device. In further embodiments, the air property adjustment device may (further) comprise any (other) device configured to adjust an air property of air (as described herein).

In specific embodiments, the air property device at least comprises the cooling device. In further embodiments, the system is configured for controlling the cooling device to control a temperature of the stable air in the range of 0-20° C., and especially the system is (also) configured for controlling the cooling device such that a temperature difference between the recirculated air and the stable air is less than 5° C., The circulation space may be arranged such that air from the stable (space) may be provided to the circulation space and air from the circulation space may be provided to the stable (space) again. The circulation space is especially functionally coupled to the stable (space). In embodiments, at least part of the circulation space may be configured external from the stable space. Yet, in specific embodiments, the circulation space may be configured in and/or surrounded by the stable space. In specific embodiments, (at least part of) the circulation space is arranged between the stable space and an (outer) wall. The stable may especially be at least partly two-walled, wherein an outer wall defines an exterior of the stable, especially wherein the outer wall defines an exterior of the stable together with a(n outer) roof, and wherein an inner wall defines the stable space, especially wherein the inner wall defines the stable space together with a(n inner) roof. The circulation space may be arranged between the inner wall and the outer wall. Herein the term "inner" such as in inner wall and inner roof especially relates to an element (such as a roof, a wall) having a side that is configured adjacent to, especially contacting, the stable air. The term "outer" especially relates to an element (such as a roof, a wall) having a side that is configured adjacent to, especially contacting, the ambient air.

Hence, in embodiments, the stable comprises a wall and a roof defining the stable space. Especially, at least part of the wall comprises an inner wall and an outer wall, wherein at least part of the circulation space is arranged between the inner wall and the outer wall. The inner wall may comprise a wall opening configured to provide a fluid connection between the stable space and the circulation space. In specific embodiments, the roof may comprise an inner roof and an outer roof, especially wherein the inner roof defines the stable space together with the inner wall, and wherein the outer roof defines the stable together with the outer wall.

In further embodiments, the inner wall and the outer wall may be separated by a minimum wall distance of 0.2 m, such as 0.5 m, especially 1.0 m. In further embodiments, the inner wall and the outer wall may be separated by a maximum wall distance of 2.5 m, such as 2.0 m, especially 1.5 m. Hence, in further embodiments, the wall distance may be selected from the range of 0.2-2.5 m, such as from the range of 1.0-2.0 m, or such as from the range of 0.5-1.5 m. The wall distance between the inner wall and the outer wall may be configured to allow a person to move in the circulation space, for example to clean the circulation space. Furthermore, the wall distance may be configured to arrange at least part of the control system and/or the air adjustment device in the circulation space.

In further embodiments, the wall opening (in the inner wall) may comprise two or more openings, such as two openings. Hence, the circulation space may provide a flow channel connecting a first wall opening of the wall opening to a second wall opening of the wall opening. Especially, (both) the first wall opening and the second wall opening provide a fluid contact between the stable space and the circulation space. The circulation space may thus comprise the flow channel. Especially, the air adjustment device(s) are configured in fluid communication with the flow channel In embodiments, the air property adjustment device may be arranged between the first wall opening and/or the second wall opening in the inner wall, especially arranged at the first wall opening, or especially arranged at the second wall opening. For example, in further embodiments, the cooling device may be arranged at the first wall opening and/or at the second wall opening and may be configured such that air flowing through the circulation space, especially via the flow channel, moves along and/or through the cooling device.

In specific embodiments, the air property adjustment device, especially the cooling device, may be arranged at the wall opening, especially at the first wall opening, such that at least part of the air, especially substantially all of the air, flowing between the stable space and the circulation space passes the air property adjustment device. Hence, by providing stable air to the circulation space, the air may essentially contact the cooling device. In further embodiments, the inner wall has an inner wall height, an inner wall thickness and an inner wall length, wherein the first wall opening stretches horizontally along the inner wall length. Especially, the first wall opening stretches horizontally for at least half of the inner wall length, such as for at least 75% of the inner wall length, wherein the cooling device is arranged along substantially the entirety of the first wall opening. Especially, the cooling device may comprise a row of cooling pads arranged along substantially the entirety of the first wall opening.

In embodiments, the stable air may be withdrawn from the stable space through the first wall opening, and recirculated air may be provided through the second wall opening, wherein the first wall opening is configured at a location closer to the floor of the stable than the second wall opening. In specific embodiments, the first wall opening may be configured close to the floor, such as configured at a distance ≤1 m to the floor, especially at a distance of ≤0.5 m. In further embodiments, the second wall opening may be configured close to the (inner) roof, such as configured at a distance ≤1 m to the (inner) roof, especially at a distance of ≤0.5 m.

In embodiments, the system may further comprise a recirculated air supply. The recirculated air supply may be configured for guiding recirculated air from the circulation space to the stable space. The recirculated air supply may be configured to (evenly) distribute recirculated air over the stable space. Especially, the recirculated air supply may comprise an air conduit arranged in the stable space. The air conduit may especially comprise perforations configured for (evenly) distributing the recirculated air over the stable space. The recirculated air supply may especially be configured at the second wall opening (near the roof). The recirculated air may especially be provided to the stable space via the recirculated air supply.

In further embodiments, the recirculated air supply, especially the air conduit, may be arranged at, especially attached to, the (inner) roof.

In yet further embodiments, at least part of the wall may be configured to transmit at least part of ambient light into the stable space. Especially, at least part of the inner wall and at least part of the outer wall may be configured to transmit at least part of the ambient light into the stable space. More especially, the (inner and outer) wall is transparent. Similarly, at least part of the roof, especially the inner roof and/or the outer roof, may be configured to transmit at least part of the ambient light. Hence, the livestock may be able to look outside, which may result in increased animal comfort. In addition, the presence of ambient light may reduce the energy requirements for lighting in the stable. Hence, in embodiments, the wall may be at least partly transparent for light, such as substantially fully transparent for light. Especially, the outer wall may be at least partially, such as substantially fully, transparent for light. Additionally or alternatively, especially the inner wall may be at least partially, such as fully, transparent for light. In specific embodiments, the inner wall and/or the outer wall may comprise glass (windows).

As aforementioned, livestock only provides part of the produced waste compound(s) (directly) to the (stable) air. Hence, the stable air comprises but part of the waste, especially GHG such as $CH_4$, produced in a typical stable. Hence, a system comprising a stable according to the invention may further handle solid and/or liquid waste, such as manure and/or urine, instead of, for example, depositing the solid waste in a manure pit. Through handling the solid and/or liquid waste, the system according to the invention may, for example, have a lower impact with regard to $CH_4$ and/or $NH_3$ emissions compared to existing systems. Manure and/or urine may be deposited (by the livestock) at the floor of the stable. $NH_3$ may be produced when urine comes into contact with manure, especially when urea (in urine) comes into contact with the enzyme urease present in manure. $CH_4$ may be produced from manure, especially through anaerobic decomposition of the manure. Hence, if the manure is in a water-based environment (resulting in reduced access to $O_2$) the methane production from manure may increase.

Hence, the system, especially the stable space, may be configured to minimize the contact between urine and manure. By minimizing the contact, both $CH_4$ and ammonia emissions may be reduced. In specific embodiments, the system may be designed to control the contact between urine and manure to selectively produce $CH_4$ and/or $NH_3$. In such embodiments, the system is configured to use the $CH_4$ and/or $NH_3$ to operate a system/device of the system.

In embodiments, the system may be configured for reducing ammonia waste, especially for one or more of (i) preventing the formation of $NH_3$, and (ii) consuming the produced $NH_3$.

Hence, in embodiments, the stable may further comprise a floor (element) configured for separating manure and urine, especially manure and urine deposited at the floor element (thereby reducing the generation of ammonia). The floor (element) may essentially promote and/or facilitate separation of manure and urine. Especially, the period that manure and urine (deposited at the floor) may contact each other may be minimized. The floor (element) may be configured such that when urine is deposited at the floor (element) it is allowed to freely flow from the floor (element), such as to a urine collection space. Furthermore, especially a flow of manure deposited at the floor (element) is substantially prevented from flowing from the floor (element), especially from flowing to the urine collection space. The floor (element) may comprise a urine duct for guiding urine to the urine collection space. The stable, especially the floor element, may further comprise a manure scraping system comprising a manure scraper arranged at the floor element. The manure scraping system, especially the manure scraper, may be configured for scraping manure from the floor element to a manure collection space.

The urine duct may be configured in a central location of the floor element. Especially, the floor element may preferably be (slightly) sloped such that the urine duct is arranged at the lowest point of the floor element, especially the floor element may provide a slope arranged at an angle selected from the range of 0-4%, such as from the range of 1-3%, such as about 2%. Hence, urine may flow towards the urine duct, whereas manure will not flow towards the urine duct due to its higher viscosity. Hence, urine and manure may be separated. Especially, urine may be directed (or allowed to freely flow) to the urine collection space continuously and especially manure is periodically directed to the manure collection space.

The urine duct may be in fluid connection to a (sealed) urine pipe, wherein the urine pipe may especially be arranged below the floor, such as below the floor element. The urine pipe may be in fluid connection to a urine collection space, especially wherein the urine pipe provides the urine to the urine collection space. In embodiments, the system may comprise a plurality of floor elements, wherein each floor element comprises a urine duct, and wherein a urine pipe is connected to two or more of the urine ducts. Hence, in embodiments, the urine pipe may collect urine from two or more urine ducts. Yet in further embodiments, each urine duct may be connected to an individual urine pipe. A urine duct may comprises a urine pipe.

Although the contact between the urine and the manure may be minimized by the design of the floor element, some $NH_3$ may still be formed. For instance, urine may comprise small amounts of manure, and especially the urine may comprise $NH_3$. Hence, in embodiments, the system may comprise an air extraction system, especially a suction module. The air extraction system may be configured to extract urine-associated air from one or more of the urine duct, the urine pipe and the urine collection space. The air extraction system may especially be configured to remove gaseous $NH_3$ from one or more of the urine duct, the urine pipe and the urine collection space. Hence, in specific embodiments, the air extraction system comprises a suction module, wherein the suction module is configured to withdraw urine-associated air from the urine pipe, especially by providing an under pressure (to the urine pipe).

In further embodiments, the air extraction system may be configured to provide the extracted urine-associated air to an ammonia processing system. In embodiments, the ammonia processing system may be configured to generate electrical energy from the $NH_3$. In further embodiments, the ammonia processing system may be configured to generate heat from the $NH_3$, especially wherein the heat is used for hygienization of the manure (see below). In yet further embodiments, the ammonia processing system may be configured to provide the $NH_3$ to the algae production system to serve as a nitrogen source for the algae (and the methane-oxidizing bacteria).

In embodiments, the manure scraping system may comprise a sprinkler configured to provide an acid liquid to the floor element, especially to the manure and/or urine. The acid (in the acid liquid) may protonate $NH_3$ to ammonium, which may be better soluble in the urine. Hence, by providing an acid, the evaporation of $NH_3$ may be reduced, and may thus lead to less waste, less stench, and an improved animal comfort. The acid liquid may further prevent solidification of the manure. Hence, the acid liquid may promote the scraping of manure by the manure scraper, resulting in less (dry) manure on the floor element and on the hooves of the livestock, which may result in increased animal comfort.

In embodiments, the manure scraper comprises a Teflon strip arranged at the bottom of the manure scraper. The Teflon strip may improve the scraping of manure. The term "bottom" in of bottom of the manure scraper especially relates to a side of the scraper configured for contacting the floor during scraping of the floor.

The manure scraping system may be configured to scrape the manure from the floor element to a manure collection space. The manure scraping system may be configured to minimize, such as substantially prevent, manure from being pushed to the urine duct. The manure scraper may especially have a shape resembling the letter W. During operation, the manure scraper may scrape manure of the floor (of the stable), and collect the manure between the $1^{st}$ and $2^{nd}$ leg of the W, as well as between the $2^{nd}$ and $3^{rd}$ leg of the W. Especially, the manure scraper may comprise a central part (at the $2^{nd}$ leg) configured to scrape manure out of the urine duct. The W-shape may be beneficial as it both (i) minimizes the amount of manure pushed to the side (relative to a —-shape), and (ii) minimizes the amount of manure pushed over/in the urine duct (relative to a V-shape).

In embodiments, the manure collection space comprises a lid element, wherein the lid element is arranged on the floor element. Especially, the lid element substantially blocks a fluid connection between the manure collection space and the stable space. In further embodiments, the manure scraper is configured to (temporarily) open the lid element such that manure may be pushed in. Especially, the manure scraper may comprise a manure scraper ramp configured to move below the lid element, thereby lifting the lid element.

The manure scraper may move at a scraping speed (or "moving speed") selected from the range of 0-5 km/h, especially from the range of 1-4 km/h, such as about 2.5 km/h. Especially, the manure scraping system may be configured to move the manure scraper at the scraping speed.

The invention further provides the floor element as described herein per se.

The manure collection space may be a closed space. The manure collection space may comprise or be functionally coupled to a hygienization device configured to provide hygienization of the manure. The term "hygienization" refers to maintaining the manure at a temperature of at least 70° C. for at least one hour. Hence, heat generated via the processing of waste products, especially $NH_3$ and $CH_4$, may be used for hygienization. Hygienization of manure may in some regions be a requirement for the sale of manure (products).

The manure collection space may further comprise or be functionally coupled to a manure processing system, especially a manure pelletizer. The manure pelletizer may be configured to provide manure pellets. Especially, the manure pelletizer may comprise a pelletizer that creates fertilizer pellets. The composition of these pellets may be determined by input streams and their relative contributions. Input streams of the manure pelletizer may be pig manure, cow manure, chicken manure, and organic matter like roadside grass and tree trimmings. By controlling the input sources as well as their relative proportion, fertilizer pellets can be created with a specific beneficial composition. In this way, fertilizer pellets for specific crops and regions may be created. The manure entering the manure pelletizer may first be mixed and the composition of the manure may be determined. Thereafter, the manure may be separated into a solid fraction and a liquid fraction by a manure decanter.

Processing of the solid fraction may then continue with a roller press, contact dryer and/or pelletizer. The roller press may increase dry matter content of the manure. The contact dryer may be a horizontal dryer system that comprises two cylinders. The outer cylinder may have a series of perforations. The perforations may be configured to facilitate water vapor to leave the dryer system through the perforations. The inner cylinder may be fully closed and may especially have (spiral-shaped) fins arranged on its outside surface. The manure may enter the processor, especially in the space between the inner cylinder and the outer cylinder. The manure may be dried via (contact) heat, especially wherein the (contact) heat is applied to the inner cylinder.

The liquid fraction of the manure may be processed to remove at least some nitrogenous compounds from the dryer system, especially most of the nitrogenous compounds, more especially substantially all of the nitrogenous compounds. In embodiments, (contact) heat may also be applied to heat the liquid fraction, especially to about 90° C., Additionally or alternatively, caustic soda (NaOH) may be added to the liquid fraction to adjust the pH. The (hot) liquid fraction may then first enter an $NH_3$ stripper where $NH_3$ is stripped with air from the liquid fraction. Thereafter, the air rich in nitrogenous compounds may be brought to the $NH_3$ washers to provide ("N-rich water") and especially wherein sulfuric acid ($H_2SO_4$) may be added to the N-rich water. The end-product of the liquid fraction process may be ammonium sulfate ($(NH_3)SO_4$). In specific embodiments, the ammonium sulfate may be mixed with the solid fraction of the manure prior to pelleting.

The future of manure processing may be to create manure pellets with a composition customized for a(n agricultural) field, especially for one or more of the condition of the field and/or the crop that will be grown on the field. For example, the aforementioned optional mixing of ammonium sulfate with the solid fraction of the manure may be carried out depending on the needs of a target field, for example if the target field is N-poor and/or S-poor. The use of different sources of manure and other sources of organic matter also creates the possibility to design a customized, especially optimized, manure pellet. In embodiments, the solid manure fraction may first be separated into phosphate and organic matter before the manure pellet is made.

In embodiments, the system, especially the manure collection space, may comprise or may be functionally coupled to a biogas production system. The biogas production system may especially be configured to produce biogas from manure. In specific embodiments, the biogas may be provided to the methane consumption system.

In embodiments, the system may comprise an airflow device. The airflow device may (be configured to) provide an airflow of stable air and/or ambient air and/or recirculated air and/or urine-associated air. Essentially, the airflow device may (be configured to) provide a plurality of airflows to withdraw air from and feed air to various spaces, devices, and systems. Especially, the airflow device may (be configured to) withdraw stable air from the stable space to a circulation space and for providing recirculated air from the circulation space to the stable space.

In embodiments, the airflow device may be configured for providing a gas filter airflow to the gas filter system, wherein the gas filter airflow comprises stable air.

In embodiments, the airflow device may be configured for providing a methane filter airflow to the methane filter system, wherein the methane filter airflow comprises stable air.

In embodiments, the airflow device may be configured for providing a dinitrogen filter airflow to the dinitrogen filter system, wherein the dinitrogen filter airflow comprises stable air and/or ambient air.

In embodiments, the airflow device may be configured for providing an oxygen filter airflow to the oxygen filter system, wherein the oxygen filter airflow comprises stable air and/or ambient air.

In embodiments, the airflow device may be configured for providing a carbon dioxide filter airflow to the carbon dioxide filter system, wherein the carbon dioxide filter airflow comprises stable air and/or ambient air.

In embodiments, the airflow device may provide a gas filter airflow to the gas filter system, especially wherein the gas filter airflow comprises stable air. Hence, the airflow device may provide (i) a methane filter airflow to the methane filter system, especially wherein the methane filter airflow comprises stable air and/or (ii) a dinitrogen filter airflow to the dinitrogen filter system, especially wherein the dinitrogen filter airflow comprises stable air and/or ambient air and/or (iii) an oxygen filter airflow to the oxygen filter system, especially wherein the oxygen filter airflow comprises stable air and/or ambient air and/or (iv) a carbon dioxide filter airflow to the carbon dioxide filter system, especially wherein the carbon dioxide filter airflow comprises stable air and/or ambient air.

In embodiments, the airflow device may be configured for providing a humidity control airflow to the humidity control element, wherein the humidity control airflow comprises stable air and/or ambient air. Especially, the airflow device may be configured for providing (and/or may provide) a dehumidifying airflow to the dehumidifier, wherein the dehumidifying airflow comprises stable air and/or ambient air.

In embodiments, the airflow device may be configured for providing (and/or provide) a temperature control airflow to the temperature control element, wherein the temperature control airflow comprises stable air and/or ambient air. Especially, the airflow device may be configured for providing (and/or may provide) a cooling airflow to the cooling device, wherein the cooling airflow comprises stable air and/or ambient air.

In embodiments, the airflow device may be configured for providing (and/or may provide) a recirculation airflow to and from the circulation space, wherein the recirculation airflow respectively comprises stable air and recirculated air.

Hence, in embodiments, the method may comprise providing stable air from the stable space to a circulation space in fluid connection to the stable space and providing recirculated air from the circulation space to the stable space. Especially, the method may further comprise adjusting an air property of air in the circulation space such that an air property of the recirculated air differs from the air property of the stable air. The air property may especially be selected from the group consisting of a temperature, a relative humidity, and an air composition.

In embodiments, the airflow device may be configured for providing (and/or may provide) an extraction airflow to extract urine-associated air from one or more of the urine duct, the urine pipe, and the urine collection space, wherein the extraction airflow comprises urine-associated air.

Especially, the airflow device may (be configured to) withdraw air from the stable space to the circulation space, especially to the one or more air property adjustment systems, wherein the one or more air property adjustment systems adjust an air property of the air, and wherein the airflow device is further configured to provide (recirculated) air from the air property adjustment systems to the stable space.

The term "airflow device" may relate to a plurality of (different) airflow devices. Especially, each of the plurality of airflow devices may be configured to provide a different airflow (as described above).

In embodiments, the airflow device may be (at least partially) arranged in the circulation space, especially in the flow channel.

In further embodiments, the system comprises a sensor system. The sensor system may comprise an air property sensor configured for sensing a parameter related to an air property of air, especially stable air. Hence, the system may control an air property of (stable) air based on a signal from the sensor system and especially the method may comprise controlling (maintaining and/or adjusting) said air property based on a signal sensed by the sensor system. Especially, the sensor system may be configured for providing a signal to an air property adjustment device and/or to a control system.

For example, in embodiments, the air property sensor may measure (sense) the temperature of the stable air, and the sensor system may provide a sensor signal to a temperature control element, wherein the temperature control element may heat or cool the (stable and/or recirculated) air based on the sensor signal.

In further embodiments, the sensor system comprises at least one air property sensor selected from the group consisting of a temperature sensor, a relative humidity sensor, and an air composition sensor. Such air composition sensor may be configured for analyzing (or may sense) a complete composition of the air, especially of stable air, or especially of ambient air, or especially of recirculated air. Alternatively, the air composition sensor may be configured to analyze one or more of a concentration of $N_2$, $CH_4$, $O_2$, $CO_2$, NMVOC, $H_2S$. The at least one air property sensor is especially arranged in the stable space.

In embodiments, the sensor system may (further) comprise a manure sensor configured for sensing a parameter related to a property of the manure, such as a spatial distribution, temperature, or composition. In further embodiments, the sensor system may comprise a urine sensor configured for sensing a parameter related to a property of the urine, such as a spatial distribution and composition, especially a urea and/or ammonia content.

In further embodiments, the air property sensor may (be configured to) sense a parameter related to a composition of the stable air. Especially, the sensor system may (be configured to) sense a concentration-related parameter, especially a concentration, of a gaseous compound. In specific embodiments, the sensor system may (be configured to) sense a concentration-related parameter of one or more gaseous compounds selected from the group comprising $CO_2$, $O_2$, $CH_4$, $N_2$, $H_2S$, and (NMVOC).

In embodiments, the sensor system may comprise a spectroscopy unit, especially a laser spectroscopy unit, configured for sensing a parameter related to an air property based on a spectroscopic analysis.

In embodiments, at least part of the sensor system may be arranged inside the stable space. In further embodiments, at least part of the sensor system may be arranged external from the stable space, such as in the circulation space, or arranged outside of the stable. In such embodiments, the stable air (sample) may be (withdrawn from the stable space and) provided to the sensor system, such as via tubing, piping, ducts or other flow channels. In further embodiments, the airflow device may be configured to continuously or periodically provide the stable air (sample) to the sensor system.

In embodiments, the sensor system may comprise a livestock temperature sensor configured to sense a parameter related to the (body) temperature of the livestock. Especially, the livestock temperature sensor may comprise an infrared sensor. Hence, in embodiments, a temperature of the livestock may be sensed/measured.

In embodiments, the system may comprise a control system. The control system may be configured to control any one of the other devices and systems described herein, especially a plurality, such as especially all devices and systems in the system. In general, the system will comprise a control system. However, in specific embodiments the system may operate without a control system.

In embodiments, the control system may comprise or be functionally coupled to the sensor system. Hence, the sensor system may be configured to provide a sensor signal to the control system. The control system may be configured to control an air property based on a sensor signal of the sensor system. Especially, the control system may be configured to control an air property adjustment device based on the sensor signal. Hence, the air property may be adjusted or maintained (by controlling the respective air property adjustment device) based on a sensed (or determined) sensor signal.

In general, (a sensor of) the sensor system may provide the sensor signal to a control system, wherein the control system is configured to process the sensor signal. The control system may control a different device/system based on (the value of) the sensor signal. For example, the control system may control the air property adjustment device or the manure scraping system or the airflow device based on (the value of) the sensor signal.

The system, especially the control system may be configured to have multiple options for controlling an air property as will be clear to a person skilled in the art. For example, if the system is to adjust the temperature in the stable air, the system may control the temperature control element, but may also control the airflow device to control the airflow provided to the temperature control element, or may control the airflow device to control an airflow between the stable air and the ambient air. Similarly, if the system is to adjust the air composition, the system may be configured to control the gas filter system and/or the airflow device to achieve the adjusted air composition.

In specific embodiments, the sensor system may be configured to sense an air property related to a concentration of $NH_3$ in the (stable and/or urine-associated) air and to provide a sensor signal to the control system, especially, the sensor system and/or the control system may be configured to determine a rate of change in the ammonia concentration in the stable air. The control system may (be configured to) control the manure scraping system based on the sensor signal, wherein the manure scraping system controls the scraping speed of the manure scraper.

In embodiments, the system, especially the control system, may (be configured to) predict a future air property of the air in the stable space. For example, a heat production of the livestock may not be constant throughout the day. Similarly, the heat production of the livestock may not be constant throughout the year but may undergo seasonal trends. Similarly, the age, especially the life phase, of the livestock may affect the $CH_4$ and/or heat production. Similarly, it may be known that a methane production of livestock increases after feeding, such as 2-3 hours after feeding. The livestock may, for example, produce more heat after feeding and may produce less heat while sleeping. The system may be configured to predict such (daily and/or monthly and/or yearly) trends in an air property and may further be configured to control the air property based on such predictions. The method, thus, may comprise predicting such (daily and/or monthly and/or yearly) trends in an air property and especially controlling the air property based on such predictions.

During operation, the recirculated air and the stable air may acquire substantially the same (value of an) air property, especially wherein the air property of the air in the stable space is optimal. The system, especially the control system, may be configured to temporarily change, such as stop, an operation of the airflow device and/or the air property adjustment device in such a situation.

In further embodiments, the system, especially the control system, may (be configured to) control an air property by controlling a gas exchange between the stable air and the ambient air. The system may, for example, control an air property of the stable air by controlling an airflow (by controlling the airflow device) such that air flows (i) into the stable (space) ("inflow"), (ii) out of the stable (space) ("outflow"), or (iii) through the stable (space) ("throughflow"). Hence, the system may be configured to control an air property by refreshing, especially (at least partly) replacing (stale) air in the stable space with (fresh) ambient air or $O_2$-enriched air, such as with pure $O_2$.

Hence, in a further aspect, the present invention further provides the method for reducing methane emissions from livestock keeping, especially wherein the livestock comprise ruminants. The method may especially comprise housing the livestock in a stable space of a closed stable, especially (of embodiments) of the system described herein. The stable space may (thus) comprise stable air and especially the livestock may provide methane to the stable air. The method especially comprises controlling a methane concentration in the system, especially in the stable air, especially by capturing methane (from the stable air). Capturing the methane from the stable air especially comprises using a methane filter system. In embodiments, the livestock is housed in the stable space year round.

In further embodiments, the method comprises controlling the methane concentration in the stable air such that the methane concentration (in the stable air) is controlled between a minimal methane concentration ($C_{m-}$), especially a minimal methane concentration $C_{m-} \geq 500$ ppmv, and a maximal methane concentration $C_{m+}$, especially a maximal methane concentration $C_{m+}$ selected to be equal to or smaller than the lower explosion limit of methane in the stable air $C_{mLEL}$. In further embodiments, the method further comprises controlling a dinitrogen concentration in the stable air by capturing dinitrogen from the stable air such that the dinitrogen concentration is smaller than the ambient dinitrogen concentration in ambient air. In further embodiments, the method further comprises (promoting) separating of manure and urine (deposited by the livestock at the floor of the closed stable). The urine may e.g. be facilitated in (freely) flowing from the floor (element), e.g. to the urine collection space. The manure may further be prevented from freely flowing from (and/or over) the floor (element), especially from flowing to the urine collection space.

In further embodiments, the method comprises providing the captured methane to a methane consumption system and/or to a methane storage system.

In further embodiments, the method comprises controlling an air property of the stable air, especially by using an air property adjustment device as described herein. In yet further embodiments, the method comprises controlling a relative humidity of the stable air, especially using a humidity control element such as described herein. In yet further embodiments, the method comprises controlling a temperature of the stable air, especially using a temperature control element as described herein. In yet further embodiments the method comprises controlling a gas composition of the stable air, especially using a gas filter system as described herein. The method may comprise filtering the stable air and/or ambient air, especially thereby controlling the concentration of the different gaseous compound in the ranges described herein for the respective gaseous compounds. In yet further embodiments, the method comprises sensing an air property of the stable air, especially using a sensor system as described herein, wherein the method further comprises controlling the air property based on a sensor signal.

In further embodiments, the method is further related to reducing ammonia emissions from livestock keeping. The method may comprise minimizing the physical contact between urine and manure (produced by the livestock). In further embodiments, the method may comprise separating urine and manure, especially using a floor element as described herein.

In embodiments, the method may comprise providing stable air from the stable space to a methane filter system comprising a methane filter, wherein the methane filter is configured to capture at least part of the $CH_4$ from the (stable) air fed to the filter. In further embodiments, the method may comprise providing filtered air from the methane filter system to one or more of the stable space and a location external from the stable.

In embodiments, the method may comprise providing stable air and/or ambient air to a nitrogen filter system, thereby capturing at least part of the nitrogen from the air provided to the nitrogen filter, and providing the filtered air to the stable space.

In embodiments, the method may further comprise flushing the methane filter with air, thereby removing the captured $CH_4$ from the methane filter to the air, and providing $CH_4$-enriched air. The $CH_4$-enriched air may be provided to the methane consumption system and/or the methane storage system.

In embodiments, the captured $CH_4$ may be provided to the methane consumption system and/or the methane storage system as part of a $CH_4$-enriched air, wherein the concentration of $CH_4$ in the $CH_4$-enriched air is selected from the range of 200,000-1,000,000 ppmv, such as 500,000-1,000,000 ppmv, especially 650,000-950,000 ppmv.

Specifically, the present invention (also) provides a method for controlling and/or operating the system as described herein.

The herein detailed embodiments may be particularly relevant for stables configured to keep cows. However, the invention is not limited to stables configured to keep cows. It will be clear to a person skilled in the art how the invention as detailed herein applies for the accommodation of a different type of livestock. For example, also chicken may suffer from heat stress, and the cooling of chicken with sprinklers may be particularly difficult. Hence, a system comprising a stable (or "pen") configured to keep chicken may be beneficial. It will be clear to a person skilled in the art that chicken do not produce substantial amounts of $CH_4$. Typically, a system according to the invention configured for chicken may thus not comprise a methane storage system and/or a methane consumption system. In contrast, particulate matter ("fine dust") may be an important aspect of the air property in relation to composition of the air for a stable configured to keep chicken. Hence, the air property adjustment device may comprise a particulate matter filter system configured to capture particulate matter from air fed to the particulate matter filter system. Furthermore, in such embodiments, the system, especially the control system, may be configured to control the composition of the air, especially wherein the system may be configured to control a concentration of particulate matter, especially by controlling the particulate matter filter system.

Furthermore, the embodiments described herein are not limited to a single aspect of the invention. For example, embodiments describing a feature of the floor element may further relate to such floor element in the system. Similarly, embodiments regarding the (housing) system may further describe a feature of the method according to the invention. With respect to the system, elements may be described as being configured for acting in a given way. Hence, in embodiments of the method comprising the element, the method may comprise acting in said given way. For instance, an embodiment of the system may be described being configured for controlling a concentration of a gaseous component in a specific range. From this, it may be clear to the skilled person that a corresponding embodiment of the method may comprise controlling (maintaining/adjusting or e.g. selecting) the concentration of the component to a value selected from the specific range (or controlled to be in the specific range). Hence, a phrase such as "the system may be configured for controlling . . . " may also refer to "the method may comprise controlling . . . ". It will be clear to a person skilled in the art how the features of the different aspects of the invention are related.

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily on scale.

DETAILED DESCRIPTION OF THE EMBODIMENTS

Figure 1:
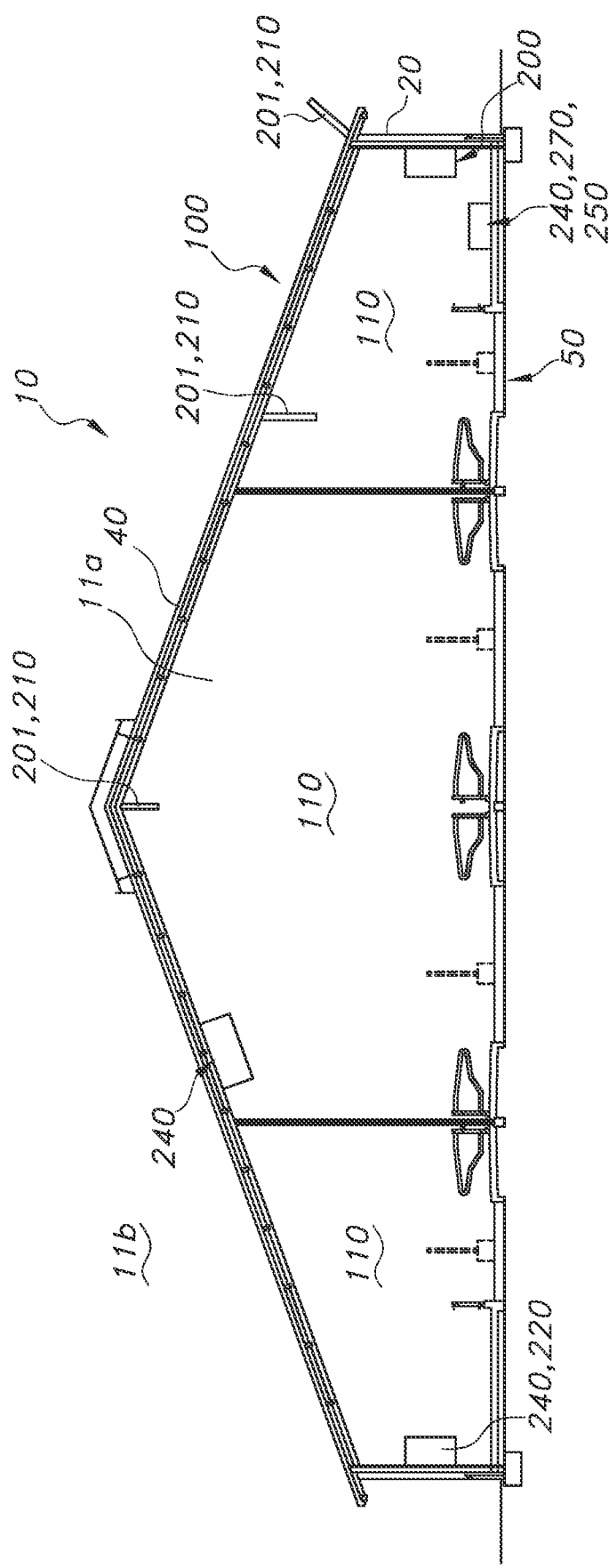
FIG. 1 schematically depicts an embodiment of the system.

FIG. 1 schematically depicts a system 10 comprising a closed stable 100 comprising a stable space 110 for housing livestock. During operation, the livestock may provide methane to stable air 11a in the stable space 110. The system 10 further may comprise a control system 200 configured for controlling in a controlling mode a methane concentration in the stable air 11a. The stable 100 comprises a wall 20 and a roof 40 defining the stable space 110 of the closed stable 100. The closed stable 100 may be configured to have substantially limited uncontrolled outflow of stable air 11a to the ambient air lib. The stable space 110 may comprise a volume, wherein an uncontrolled outflow of stable air 11a from the stable space 110 (to the ambient air lib) per hour is less than 2% of the volume. A closed stable 100 may be particularly beneficial with regard to the controlling of an air property (of stable air 11a) at a different value than the (air property of the) ambient air 11b.

The system 10 comprises an air property adjustment device 240 configured to adjust an air property of the stable air 11a. In further embodiments, the air property adjustment device may comprise a device selected from the group consisting of a temperature control element, a humidity control element, a gas filter system 220, or a pressure control element.

In further embodiments, the air property adjustment device may be functionally coupled to a control system 200. The control system may be configured to control the air property adjustment device 240. The control system 200 may further be configured to control an air property of stable air 11a.

In the depicted embodiment, the system 10 comprises a dehumidifier 270. In FIG. 1, the air property adjustment device 240 comprises the dehumidifier 270, wherein the system 10, especially the control system 200, is configured for controlling the dehumidifier 270 to control a relative humidity of the stable air 11a in the range of 20-80%, such as 35-75%, especially 50-70%.

In the depicted embodiment, the system 10 further comprises or is functionally coupled to a cooling device 250. Especially, the air property adjustment device 240 comprises a cooling device 250, wherein the system 10 is configured for controlling the cooling device 250 to control a temperature of the stable air 11a in the range of −15-(+)25° C., such as 0-20° C., especially 10-15° C., such as 7-14° C. The cooling device 250 and the dehumidifier 270 may be the same device (as depicted in FIG. 1). Especially the cooling device 250 may be functionally coupled to the control system 200, wherein the control system 200 is configured for controlling the cooling device 250 to control a temperature of the stable air 11a in the range of −15-25° C., such as 0-20° C., especially 10-15° C.

The system 10 may further comprise a sensor system 201 comprising a sensor 210 configured for sensing a parameter related to an air property of air, especially stable air 11a, and for providing a signal to an air property adjustment device 240 and/or to the control system 200.

In embodiments, the stable 10 further comprises a floor element 50 configured for separating of manure 51 and urine 52 deposited at the floor element 50.

In embodiments, at least part of the wall 20 is configured to transmit at least part of ambient light into the stable space 110.

Figure 2:
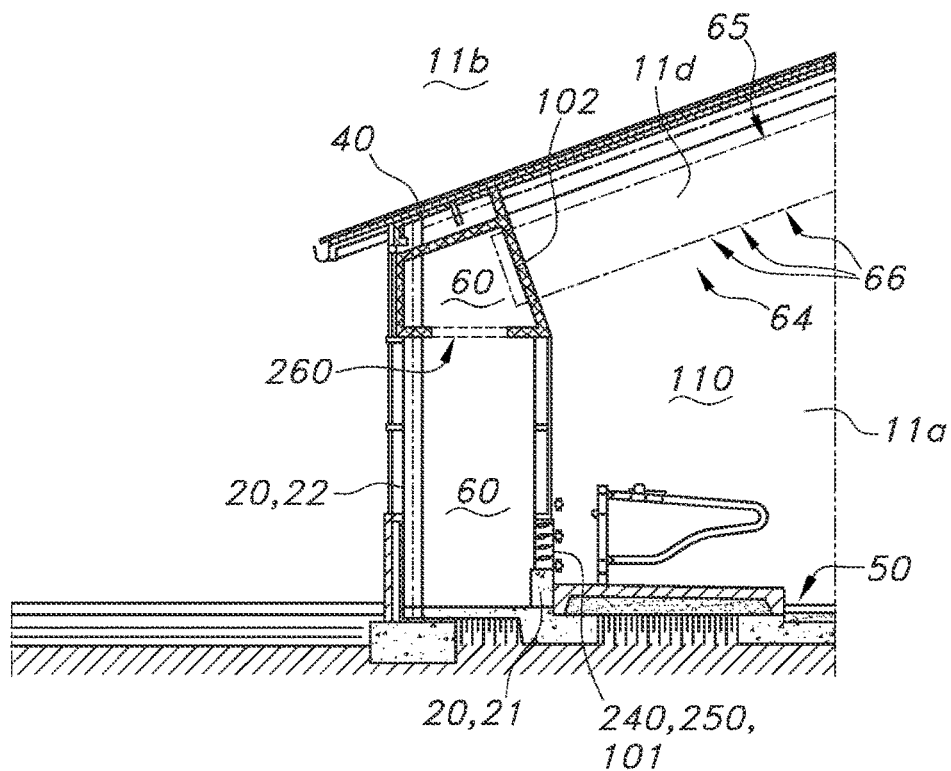
FIG. 2 schematically depicts aspects of the system comprising a circulation space.

FIG. 2 schematically depicts embodiments of the system 10 comprising a circulation space 60. For visualization purposes only, only part of the system is depicted. The circulation space 60 is in fluid connection to the stable space 110. The circulation space 60 may be configured to receive stable air 11a from the stable space 110 and to provide recirculated air 11d to the stable space 110. The circulation space 60 may be functionally coupled to an air property adjustment device 240 configured such that an air property of the recirculated air 11d differs from the air property of the stable air 11a. The air property may be selected from the group consisting of a temperature, a relative humidity, an air composition, and pressure. In the depicted embodiment, the stable 100 comprises a wall 20 and a roof 40 defining the stable space 110. At least part of the wall 20 comprises an inner wall 20,21 and an outer wall 20,22. At least part of the circulation space 60 is arranged between the inner wall 21 and the outer wall 22. The inner wall 21 comprises a wall opening 101, 102 configured to provide the fluid connection between the stable space 110 and the circulation space 60.

The wall opening 101,102 may comprise two or more openings, such as two openings. Hence, the circulation space 60 may provide a flow channel connecting a first wall opening 101 of the wall opening 101, 102 to a second wall opening 102 of the wall opening 101, 102. The flow channel may especially be configured to feed air to the air adjustment device 240. Especially, stable air 11a may be provided to the circulation space 60 through the first wall opening 101, and recirculated air 11d may be provided to the stable space 110 through the second wall opening 102.

In the depicted embodiment, the air property adjustment device 240 is arranged at the wall opening 101, 102, especially at the first wall opening 101, such that at least part of the air, especially substantially all of the air, flowing between the stable space 110 and the circulation space 60 passes the air property adjustment device 240.

In embodiments, the air property adjustment device 240 may comprise one or more of a gas filter system 220, especially the methane filter system 220a, and/or the dinitrogen filter system 220b; a humidity control element, especially a dehumidifier 270; and a temperature control element, especially a cooling device 250. In the depicted embodiment, the air property adjustment device comprises the cooling device 250. The cooling device 250 is arranged at the first wall opening 101 (but may also be arranged at the second wall opening 102) such that at least part of the air flowing between the stable space 110 and the circulation space 60 passes the cooling device 250.

In further embodiments, the system 10, especially the control system 200, is configured for controlling the cooling device 250 such that a temperature difference between the recirculated air 11d and the stable air 11a is less than 5° C., such as less than 4° C., especially less than 3° C. Hence, in embodiments, the method may comprise controlling a temperature difference between the recirculated air and the stable air to be less than 5° C., such as less than 4° C., especially less than 3° C.

In yet further embodiments, the system 10 comprises a recirculated air supply 64 configured for guiding recirculated air lid from the circulation space 60 to the stable space 110. The recirculated air supply 64 comprises an air conduit 65 arranged in the stable space 110. The air conduit may comprise perforations 66 configured for distributing the recirculated air lid over the stable space HO. Hence, the circulation space may be configured to provide recirculated air lid to the stable space 110 via the recirculated air supply 64. In specific embodiments, the air conduit 65 is arranged at the roof 40, especially attached to the roof 40. The recirculated air supply may especially be in fluid connection to the second wall opening 102.

In the depicted embodiment, the stable air 11a is withdrawn from the stable space 110 through the first wall opening 101, and recirculated air lid is provided through the second wall opening 102, wherein the first wall opening 101 is lower than the second wall opening 102. The first wall opening 101 may be configured close to the floor, such as configured at a distance ≤1 m to the floor, especially at a distance of ≤0.5 m. The second wall opening 102 may be configured close to the roof 40, such as configured at a distance ≤1 m to the (inner) roof, especially at a distance of ≤0.5 m.

In the depicted embodiment, the system 10 further comprises an airflow device 260. The airflow device 260 is (at least partially) arranged in the circulation space 60. The airflow device is configured for providing a recirculation airflow to and from the circulation space 60, wherein the recirculation airflow respectively comprises stable air 11a and recirculated air lid. In further embodiments, the airflow device 260 may further be configured for providing one or more of a methane filter airflow to a methane filter system 220a, wherein the methane filter airflow comprises stable air 11a, a dinitrogen filter airflow to a dinitrogen filter system 220b, wherein the dinitrogen filter airflow comprises stable air 11a and/or ambient air 11b, a dehumidifying airflow to a dehumidifier 270, wherein the dehumidifying airflow comprises stable air 11a and/or ambient air 11b, a cooling airflow to a cooling device 250, wherein the cooling airflow comprises stable air 11a and/or ambient air 11b, and an extraction airflow to extract urine-associated air from one or more of a urine duct 53 and a urine collection space, wherein the extraction airflow comprises urine-associated air.

Hence, in embodiments, the wall 20 of the stable 100 consists of two walls 20 that are separated by a space of, for example, approximately 1 meter. The outer wall 20,22 may be fully closed. In further embodiments at least part of the outer wall 20,22 may be transparent. Especially, the outer wall 20,22 may be transparent. The inner wall 20,21 may be partially closed. In further embodiments, at least part of the inner wall 20,21 may be transparent. Especially, the inner wall 20,21 may be transparent. Between the inner wall 20,21 and the outer wall 20,22, especially in the circulation space 60, the air pressure may be slightly lower than in the stable 100, providing stable air 11a from the stable space 110 to the circulation space 60 through the cooling device 250, especially through a cooling pad. In the depicted embodiment, the cooling device 250 is located at the bottom of the inner wall 20,21 at first wall opening 101 through which stable air 11a flows from the stable space 110 into the circulation space 60, and is configured to cool and dehumidify the air flowing through.

In further embodiments, the air in the circulation space 60 may be brought to an upper pressure chamber between the walls via an airflow device 260, such as a ventilator. The air may be recirculated into the stable space 110 from the upper pressure chamber via an air conduit 65, wherein the air conduit 65 may comprise perforations 66 configured to distribute the recirculated air lid over the stable space 110.

Figure 3:
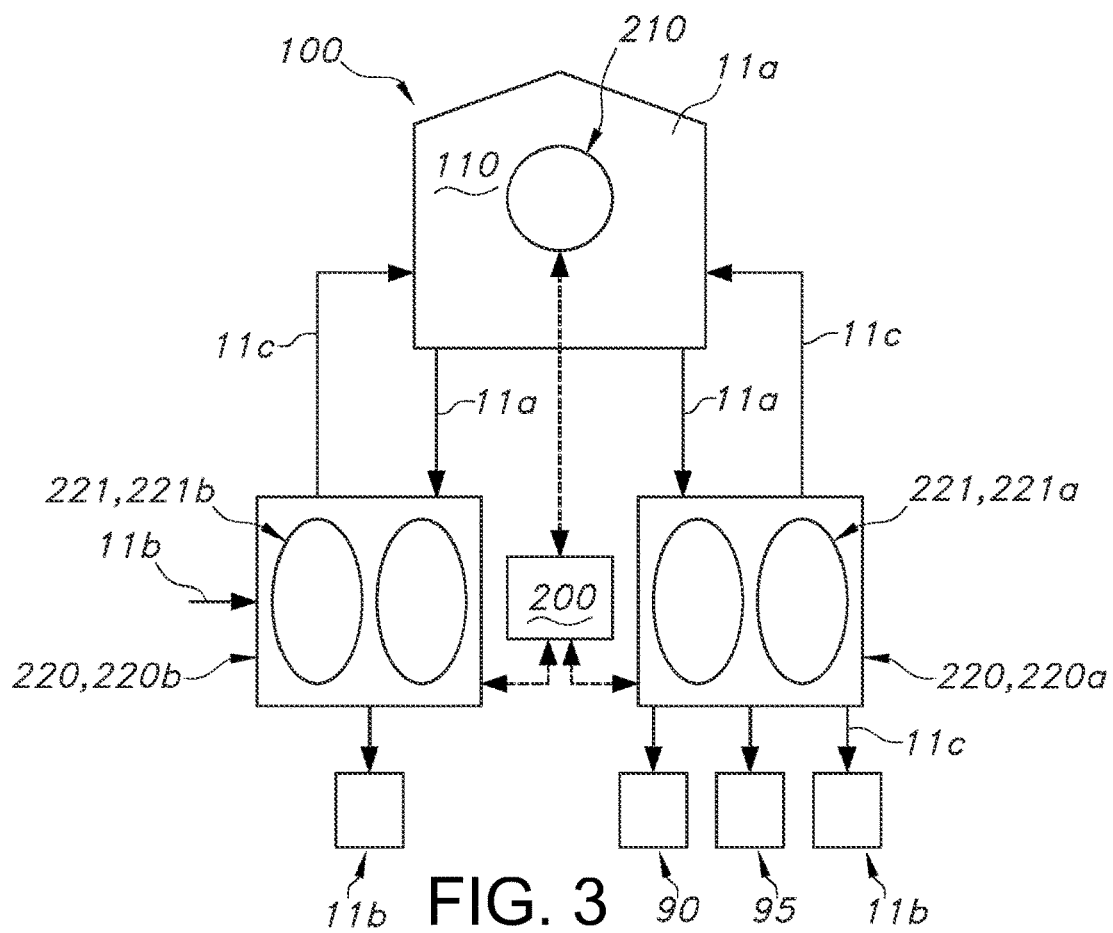
FIG. 3 schematically depicts aspects of the gas filter system.

FIG. 3 schematically depicts an embodiment of the system 10 comprising or functionally coupled to a gas filter system 220. The gas filter system 220 comprises a gas filter 221 configured for capturing a gaseous compound from the air fed to the gas filter 221. In embodiments, the air fed to the gas filter system 221 may comprise stable air 11a. In further embodiments, the air fed to the gas filter 221 may comprise ambient air 11b. The gas filter system 220 may be configured to provide the filtered air 11c to the stable air 11a and/or to the ambient air 11b. The gas filter system 220 may be functionally coupled to the control system 200, i.e., the control system 200 may be configured to control the gas filter system 220, especially to control an air property of the stable air 11a. The control system may further be functionally coupled to a sensor system 201 comprising a sensor 210 configured to sense an air property of (stable) air. The sensor 210 may especially be arranged in the stable space 110.

In embodiments wherein the circulation space 60 comprises the gas filter system 220, the recirculated air lid and the filtered air 11c may be the same air, especially the recirculated air lid may comprise the filtered air 11c.

In the depicted embodiment, the system 10 comprises both a methane filter system 220, 220a and a nitrogen filter system 220, 220b.

The methane filter system 220a comprises a methane filter 221a configured for capturing methane from the air fed to the methane filter 221a. In the depicted embodiment, only stable air 11a is fed to the methane filter 221a. The methane filter system 220a is configured to provide the captured methane to a methane consumption system 90 and/or to a methane storage system 95. In specific embodiments, the methane filter system 220a is configured to provide the captured methane to the methane consumption system 90, wherein the methane consumption system 90 comprises one or more of a combined heat power system, an algae production unit, and a liquefied natural gas production system. The methane filter system is further configured to provide filtered air 11c to the stable air 11a and/or to the ambient air 11b. In further embodiments, the system 10, especially the control system 200, is configured for controlling (in a controlling mode) the methane concentration in the stable air 11a between a minimal methane concentration $C_{m-}$ and a maximal methane concentration $C_{m+}$, wherein $C_{m-} \geq 500$ ppmv, and wherein $C_{m+} \leq 45,000$ ppmv. Especially, the system 10 may control the methane concentration in the stable air 11a by controlling the gas filter system 220, especially the methane filter system 220a or the nitrogen filter system 220b, or by controlling an airflow of air to the gas filter system 220. In yet further embodiments, $C_{m-} \geq 5000$ ppmv, and $C_{m+} \leq 45,000$ ppmv.

The dinitrogen filter system 220b comprises a dinitrogen filter 221b configured for capturing dinitrogen from the stable air 11a and/or from ambient air 11b fed to the dinitrogen filter 221b. The dinitrogen filter system 220b is configured to provide the filtered air 11c to the stable air 11a. The dinitrogen filter system 220b is configured to provide the captured dinitrogen to the ambient air 11b. In further embodiments, the system 10, especially the control system 200, is configured for controlling in a controlling mode a dinitrogen concentration in the stable air 11a to be in a range of 700,000-780,000 ppmv.

In further embodiments, the gas filter system 220 comprises a swing adsorption system, especially a pressure swing adsorption system. Especially, the methane filter system 220a comprises a methane pressure swing adsorption system.

In further embodiments, the system 10, especially the control system 200, is configured for controlling in a controlling mode the concentration of: methane ($CH_4$) to be in the range of 0-45,000 ppmv, dinitrogen ($N_2$) to be in the range of 700,000-780,000 ppmv, dioxygen ($O_2$) to be in the range of 180,000-240,000 ppmv, carbon dioxide ($CO_2$) to be in the range of 0-20,000 ppmv, ammonia (ME) to be in the range of 0-1,000 ppmv, non-methane volatile organic compounds (NMVOC) to be in the range of 0-500 ppmv, and hydrogen sulfide ($H_2S$) to be in the range of 0-500 ppmv. In such embodiments, the system 10, especially the control system 200, may comprise or be functionally coupled to a gas filter system 220 comprising a gas filter 221 configured to capture one or more of $CH_4$, $N_2$, $O_2$, $CO_2$, Mb, NMVOC, and $H_2S$, especially one or more of $N_2$, $O_2$, $CO_2$, $NH_3$, NMVOC, and $H_2S$.

Figure 4:
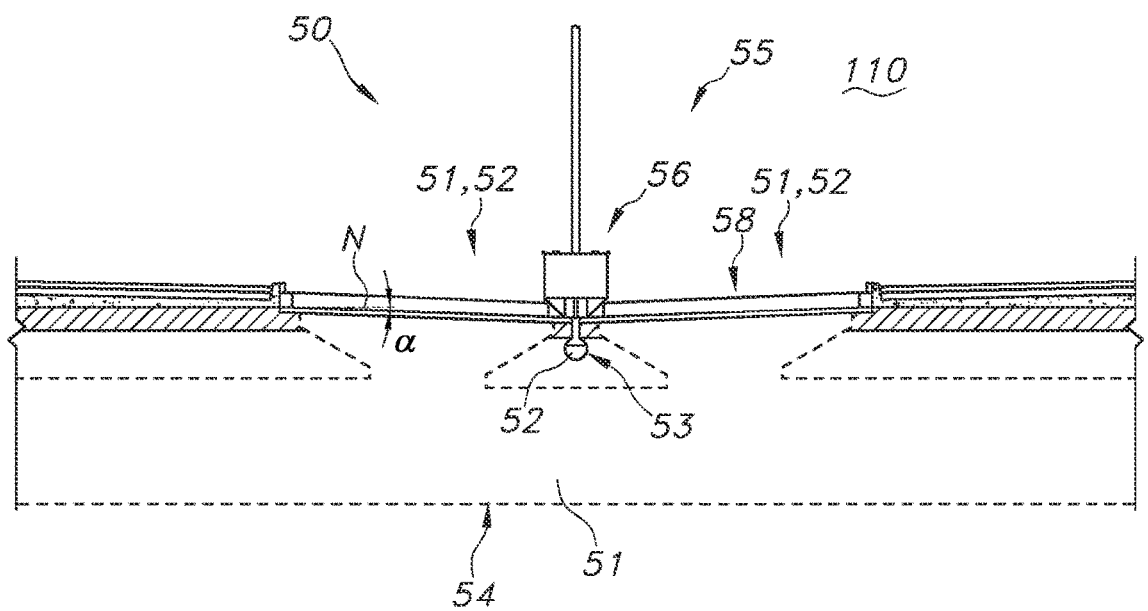
FIGS. 4-5 schematically depict aspects of the floor element and the manure scraping system.
Figure 5:
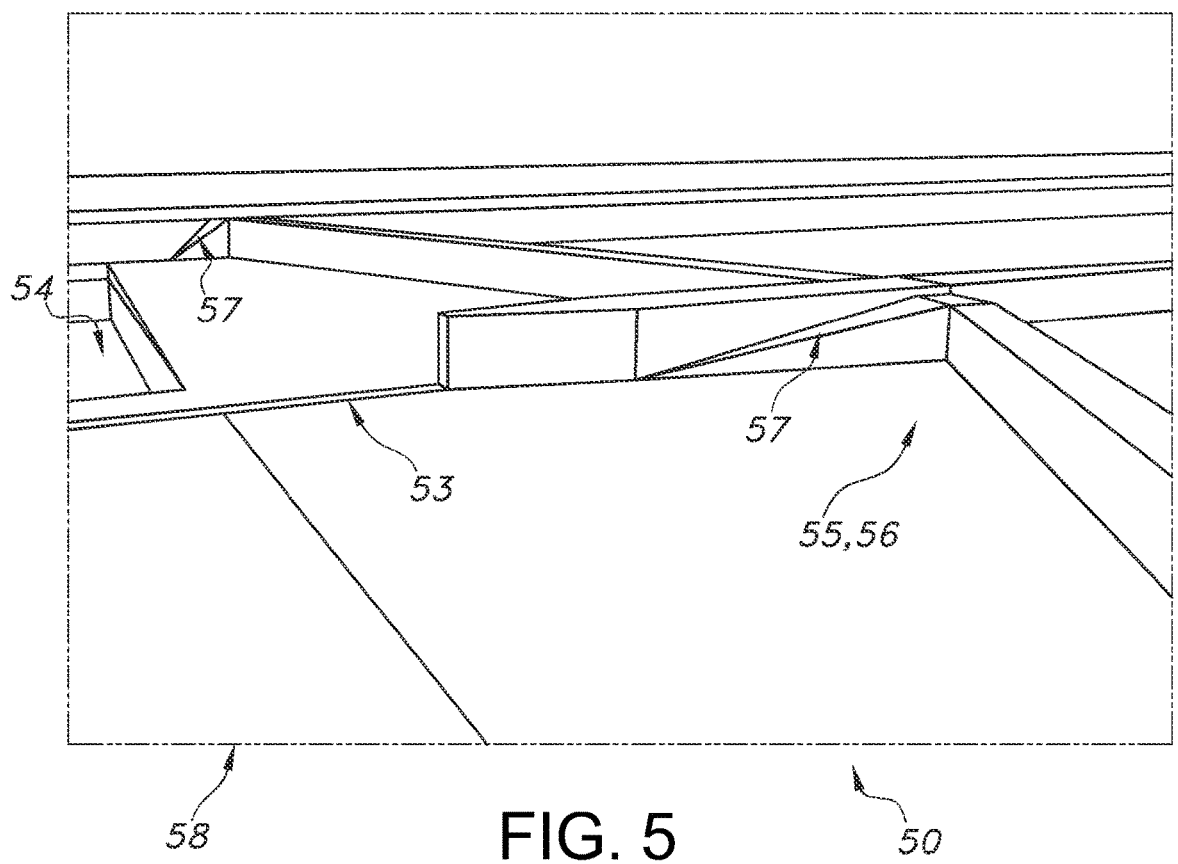

FIGS. 4 and 5 schematically depict aspects of the floor element 50 (in a stable 100). The floor element 50 comprises a urine duct 53 for guiding urine 52 to a urine collection space (in the stable) (not depicted in the figures). The floor element 50, further comprises a manure scraping system 55 comprising a manure scraper 56 arranged at the floor element 50 and configured for providing manure 51 from the floor element 50 to a manure collection space 54 (in the stable 100). The floor element 50 comprises a floor arranged at a slope at an angle α (relative to horizontal plane N), wherein the floor slopes down to a urine duct 53. In embodiments, the angle α may be selected from the range of 0.5-5°, such as from the range of 1.5-4°, such as 2-3°.

In the embodiment of FIG. 4, the urine duct 53 is arranged centrally on the floor element 50. The floor element 50 is arranged such that the urine duct is arranged at a lowest point of a slope (at an angle α) of the floor element. The slope is selected such that urine 52 substantially flows towards the urine duct 53, whereas the more viscous manure 51 does not substantially flow towards the urine duct 53. Rather, the manure scraper 56 is configured to provide manure 51 from the floor element 50, especially from the floor, to the manure collection space 54. In the depicted embodiment, the manure collection space 54 comprises transport tubing configured to receive the manure and to provide the manure 51 to a further part of the manure collection space 54.

In further embodiments, the urine duct 53 is configured for the extraction of urine-associated air. Especially, the system may comprise an air extraction system, wherein the air extraction system is configured to extract urine-associated air from the urine duct 53. In yet further embodiments, the air extraction system may be configured to extract urine-associated air from the urine collection space. In yet further embodiments, the air extraction system may be configured to provide the extracted urine-associated air to an ammonia processing system. Hence, in embodiments, the method may comprise extracting urine-associated air from urine, and especially providing the extracted urine-associated air to an ammonia processing system.

FIG. 5 depicts an embodiment of the manure scraping system 55 and the manure scraper 56. The manure scraper 56 has a shape resembling the letter W. The manure scraper 56 comprises a central part configured to scrape manure 51 out of the urine duct 53. The W-shape may be beneficial as it both (i) reduces (minimizes) the amount of manure 51 pushed to the side (relative to an —-shape, or a ˆ-shape), and (ii) reduces (minimizes) the amount of manure 51 pushed over/in the urine duct 53 (relative to a V-shape). In the depicted embodiment, the floor element 50 further comprises a lid element 58 configured to substantially block fluid contact between the manure collection space 54 and the stable space 110. Hence, the manure scraper 56 further comprises a manure scraper ramp 57 configured to move below the lid element 58, thereby lifting the lid element 58. By lifting the lid element 58, the manure scraper 56 can push the manure 51 into the manure collection space 54.

Figure 6:
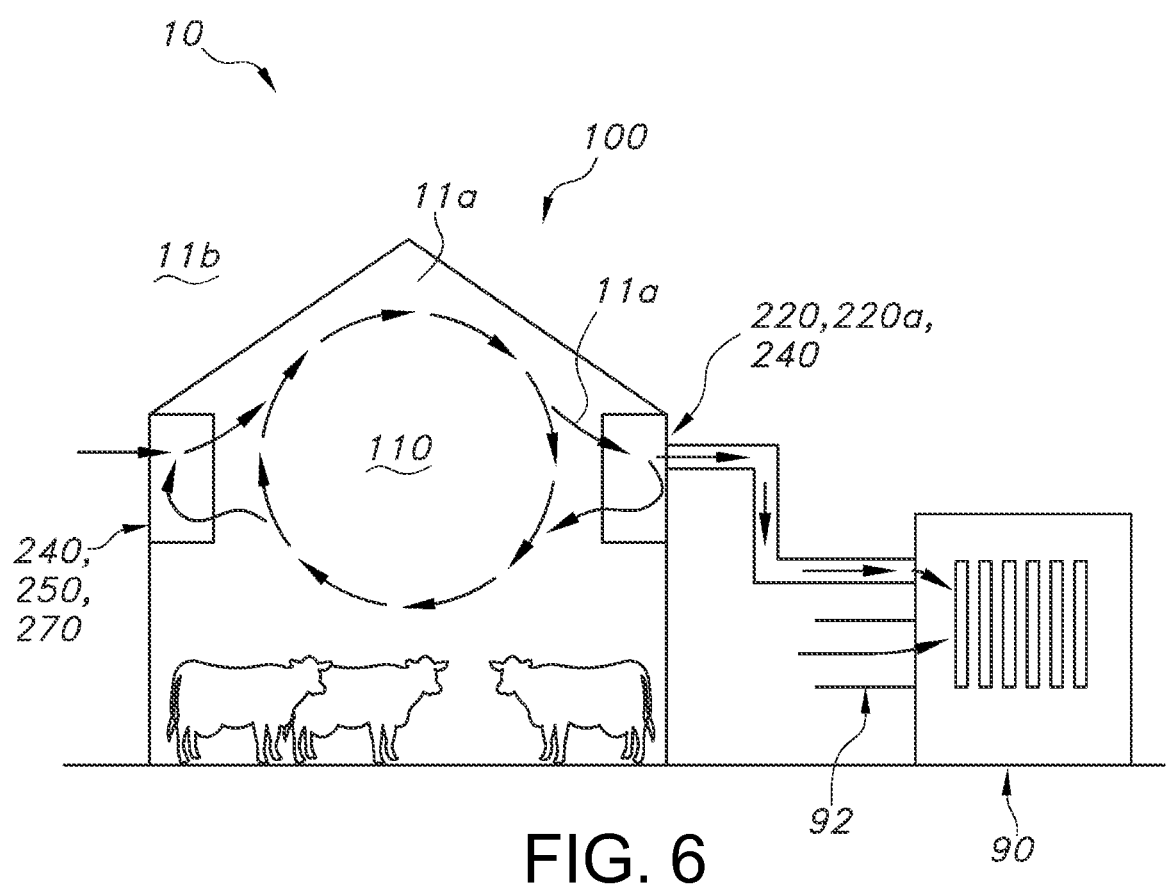
FIG. 6 schematically depicts some further aspects of the system.

FIG. 6 schematically depicts an embodiment of the system 10 and the circulation of air in the stable space 110. In the embodiment, the system comprises a plurality of air property adjustment devices 240. At least one of the air property adjustment devices 240 comprises a cooling device 250 and dehumidifier 270, especially a cooling device 250 configured to also reduce the relative humidity. At least one other one of the air property adjustment devices 240 comprises a methane gas filter system 220,220a. The stable air 11a circulates through the stable space 110. The livestock, depicted as cattle, may continuously produce $CH_4$, $CO_2$, heat and water vapor that will increase the temperature and relative humidity inside the stable 100. Regardless, in the depicted embodiment, the system 10, especially the control system 200, may be configured to provide a constant temperature and relative humidity in the stable 100. The cooling device 250 cools and dehumidifies the stable air 11a. In the embodiment, the stable 100 may be fully closed to accomplish this constant climate. The methane gas filter system 220a captures $CH_4$ from the stable air 11a and provides the captured $CH_4$ to a methane consumption system 90. In the depicted embodiment, the methane consumption system 90 is configured to receive a second feed 92. The second feed may comprise, for example, biogas (from a biogas production unit) and/or $NH_3$-enriched air (from the air extraction system and/or from an ammonia processing system). The methane consumption system may provide a methane consumption output, such as $CO_2$ (provided to ambient air 11b), electricity (to power the system), heat (to provide heating of the stable and/or hygienization of manure), biogas, PHB, algae biomass, and other products.

Hence, FIG. 6 further illustrates a method for reducing methane emissions from livestock, the method comprising: housing the livestock in a stable space 110 of a closed stable 100, especially wherein the livestock provide methane to stable air 11a in the stable space (110); controlling a methane concentration in the stable air 11a by capturing the methane from the stable air 11a (using a methane filter system 220a) such that the methane concentration (in the stable air 11a) is between a minimal methane concentration $C_{m-}$ and a maximal methane concentration $C_{m+}$, wherein $C_{m-} \geq 500$ ppmv, and wherein $C_{m+} < 45,000$ ppmv; providing the captured methane to a methane consumption system 90 and/or a methane storage system 95, especially to a methane consumption system 90 in the depicted embodiment. Herein, a number of thousand may be indicated by a dot separating the number and three zeros. Hence 1,000, 2,000 and the like especially refers to one thousand, two thousand (also written as 1,000 and 2,000 or 1000 and 2000) etc.

The term "plurality" refers to two or more.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%.

The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in embodiments refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein. The term "further embodiment" may refer to embodiments comprising the features of the previously discussed embodiment, but may also refer to an alternative embodiment.

The devices, apparatus, or systems may herein amongst others be described during operation. As will be clear to the person skilled in the art, the invention is not limited to methods of operation, or devices, apparatus, or systems in operation. The term "controls" and similar terms herein especially relates to a device, apparatus, or system during operation, especially during a controlling mode. Hence, a phrase such as "configured for controlling" especially refers to "configured for controlling in a controlling mode". The device, apparatus, or system may also be operated in a non-controlling mode. The device, apparatus, or system may further be operated in two or more different controlling modes, especially wherein the controlling modes are temporally separated.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to". The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

Effects of the Measures

For a dairy farm having incorporated measures described herein and a standard dairy farm, emissions have been calculated and compared. The conditions of the two systems are given below:

|  | Standard dairy farm | embodiment of a farm according to the invention | difference |
| --- | --- | --- | --- |
| Number of dairy cows | 100 | 100 | — |
| Total area (hectare) | 47 | 42 | 5.32 |
| of which grass land, and | 37.8 | 17.7 | 20.13 |
| silage maize | 9.4 | 24.2 | −14.82 |
| Production milk (kg/cow) | 8500 | 14000 | −5500 |

(i) The area for the production of silage maize in the embodiment of a farm of the invention corresponds to the required total amount of roughage per cow (no further roughage has to be purchased externally, only feed concentrates are purchased, (ii) The production per cow of 14000 kg milk is calculated based on the higher productivity resulting from the excess of energy per cow, which energy normally is required for cooling. The energy may now be used for milk production, without applying additional feed, (ii) The embodiment of the farm of the invention comprises an embodiment of the floor element described herein and a methane consumption system comprising a combined heat power system coupled to a hygienization system.

Based on these conditions, the emissions are compared, see next table. In the table the energy use is directly depicted in kg $CO_2$ emitted, and the emissions of the other greenhouse gases (GHG) $N_2O$ and $CH_4$ are given in kgs of the respective compound as well as in equivalent kgs $CO_2$.

| Emission/use | standard farm | embodiment of the invention | difference |
| --- | --- | --- | --- |
| Emission $N_2O$ (kg $N_2O$) | 10.70 | 5.46 | 5.241 |
| in (kg $CO_2$) | 150,502 | 68,202 | 82,300 |
| Emission of $CH_4$ (kg $CH_4$) | 435.90 | 15.30 | 420.602 |
| in (kg $CO_2$) | 576,085 | 17,943 | 558,143 |
| Energy use/emission of $CO_2$ (kg $CO_2$) | 234,125 | 91,919 | 142,206 |
| Total emission GHG (kg $CO_2$) | | | |
| Per farm | 960,712 | 178,063 | 782,649 |
| Per cow | 9,607 | 1,781 | 7,826 |
| Per kg milk | 1.13 | 0.13 | 1.00 |
| Emission $NH_3$ (kg $NH_3$) | 1818 | 143 | 1675[3] |

[1] In which about 65% is the result of housing the cows in the closed stable as such;
[2] In which about 77% is the result of capturing CH4.
[3] In which about 5% is the result of housing the cows in the closed stable as such.

The invention claimed is:

1. A system comprising:
a closed stable comprising a stable space for housing ruminants;
a methane filter system comprising a methane filter configured for capturing methane ($CH_4$) from stable air fed to the methane filter, to provide (i) filtered air to the stable air and/or to ambient air, and (ii) captured $CH_4$ to a methane consumption system and/or to a methane storage system;
a dinitrogen filter system, wherein the dinitrogen filter system comprises a dinitrogen filter configured for capturing dinitrogen ($N_2$) from the stable air and/or from ambient air fed to the dinitrogen filter, and wherein the dinitrogen filter system is configured to provide the captured dinitrogen ($N_2$) to the ambient air; and
an oxygen filter system configured upstream of the methane filter and configured to lower an oxygen ($O_2$) concentration of the stable air fed to the methane filter to at least below a limiting oxygen concentration for $CH_4$, wherein:
the system is configured for controlling in a controlling mode a methane concentration in the stable air between a minimal methane concentration $C_{m-} \geq 500$ ppmv and a maximal methane concentration $C_{m+}$ selected to be equal to or smaller than the lower explosion limit of methane in the stable air $C_{mLEL}$; and wherein
the system is configured for controlling in the controlling mode a dinitrogen ($N_2$) concentration in the stable air to be smaller than the ambient dinitrogen concentration in ambient air.

2. The system according to claim 1, wherein the system is configured for controlling in the controlling mode the concentration in the stable air of:
methane ($CH_4$) to be in the range of 500-45,000 ppmv,
dinitrogen ($N_2$) to be in the range of 700,000-780,000 ppmv,
dioxygen ($O_2$) to be in the range of 180,000-240,000 ppmv,
carbon dioxide ($CO_2$) to be in the range of 0-20,000 ppmv,
ammonia ($NH_3$) to be in the range of 0-1,000 ppmv,
non-methane volatile organic compounds to be in the range of 0-500 ppmv, and hydrogen sulfide ($H_2S$) to be in the range of 0-500 ppmv.

3. The system according to claim 1, wherein the system comprises:
a circulation space in fluid connection to the stable space, wherein the circulation space is configured to receive stable air from the stable space and to provide recirculated air to the stable space, and
wherein the circulation space is functionally coupled to an air property adjustment device configured such that a plurality of air properties of the recirculated air differ from the air properties of the stable air,
wherein the air properties comprise a temperature, a relative humidity, and an air composition, and
wherein the air property adjustment device at least comprises a cooling device wherein the system is configured for controlling the cooling device to control a temperature of the stable air in the range of 0-20° C., and
wherein the system is configured for controlling the cooling device such that a temperature difference between the recirculated air and the stable air is less than 5° C., wherein:
the stable comprises a wall and a roof defining the stable space, wherein:
at least part of the wall comprises an inner wall and an outer wall,
at least part of the circulation space is arranged between the inner wall and the outer wall, and
the inner wall comprises a wall opening configured to provide the fluid connection between the stable space and the circulation space, and
wherein the cooling device is arranged at the wall opening such that at least part of the air flowing between the stable space and the circulation space passes the cooling device, and
wherein the cooling device is further configured for controlling a relative humidity of the stable air in the range of 35-80%.

4. The system according to claim 3, wherein the system comprises:
a recirculated air supply configured for guiding recirculated air from the circulation space to the stable space, wherein the recirculated air supply comprises an air conduit arranged in the stable space, and
wherein the air conduit comprises perforations configured for distributing the recirculated air over the stable space.

5. The system according to claim 3, wherein the system further comprises an airflow device configured for providing one or more of:
a methane filter airflow to the methane filter system, wherein the methane filter airflow comprises stable air,
a dinitrogen filter airflow to the dinitrogen filter system, wherein the dinitrogen filter airflow comprises stable air and/or ambient air,
a cooling airflow to the cooling device, wherein the cooling airflow comprises stable air and/or ambient air, and
a recirculation airflow to and from the circulation space, wherein the recirculation airflow respectively comprises stable air and recirculated air.

6. The system according to claim 1, wherein the stable further comprises:
a floor element configured for separating manure and urine deposited at the floor element, wherein the floor element comprises a urine duct for guiding urine to a urine collection space, and
wherein the system further comprises an air extraction system, wherein the air extraction system is configured to extract urine-associated air from one or more of the urine duct and the urine collection space.

7. The system according to claim 1, wherein the oxygen filter system is configured to lower the $O_2$ concentration to below 10 vol. %.

8. The system according to claim 1, wherein the system comprises the methane consumption system, wherein the methane consumption system comprises a combined heat power system, wherein the combined heat power system is configured to consume $CH_4$ from the methane filter system and/or from the methane storage system.

9. The system according to claim 1, wherein the system further comprises
an algae production unit,
the methane consumption system, wherein the methane consumption system comprises a combined heat power system, wherein the combined heat power system is configured to consume $CH_4$ from the methane filter system and/or from the methane storage system, wherein the combined heat power system is configured to provide $CO_2$ to the algae production unit.

10. The system according to claim 9, wherein the algae production unit comprises methane oxidizing bacteria combined with algae, and wherein the system is further configured to feed $CH_4$ to the algae production unit.

11. A method for reducing gaseous emissions from livestock keeping, wherein the livestock comprises ruminants, the method comprising:
housing the livestock in a stable space of a closed stable, wherein the stable space comprises stable air;
controlling a methane concentration in the stable air by capturing methane from the stable air such that the methane concentration is controlled in the range of 500-45,000 ppmv;
controlling a dinitrogen concentration in the stable air by capturing dinitrogen from the stable air such that the dinitrogen concentration is smaller than the ambient dinitrogen concentration in ambient air; and
providing the captured methane to a methane consumption system and/or a methane storage system, wherein prior to capturing the methane from the stable air, oxygen is removed from the stable air to provide an oxygen concentration below 10 vol. %.

12. The method according to claim 11, wherein the methane concentration $C_{m-}$ is controlled in the range of 5000-45,000 ppmv, and wherein the method further comprises controlling the dinitrogen concentration in the stable air to be in the range of 700,000-780,000 ppmv.

13. The method according to claim 11, the method further comprising:
(i) separating manure and urine deposited by the livestock at a floor of the closed stable, and
(ii) extracting urine-associated air from urine and providing the extracted urine-associated air to an ammonia processing system.

14. The method according to claim 11, the method comprising providing the stable air to a cooling device and/or a dehumidifier to control a relative humidity of the stable air in the range of 35-80%, and/or to control a temperature of the stable air in the range of 0-20° C.

15. The method according to claim 11, wherein the captured methane is provided to the methane storage system, wherein the methane concentration in the methane storage system is selected in the range of 50-100 vol. %.

16. The method according to claim 11, wherein the method comprises providing the captured methane directly or via the methane storage system to a combined heat power system to produce energy, heat, and $CO_2$, and providing the $CO_2$ to an algae production unit to grow algae and produce algal products.

17. The method according to claim 16, wherein the method further comprises one or more of:
   feeding the algae produced in the algae production unit to the livestock in the stable or
   using the algae and/or the algae products as fertilizer, food colorant, or fuel.

* * * * *